US012515434B2

(12) United States Patent
Boshaw et al.

(10) Patent No.: US 12,515,434 B2
(45) **Date of Patent: *Jan. 6, 2026**

(54) CONFORMABLE, RECYCLABLE SHIPPING CONTAINER, MACHINE AND METHOD

(71) Applicant: PAC WORLDWIDE CORPORATION, Redmond, WA (US)

(72) Inventors: James Arne Boshaw, Bellevue, WA (US); Paul Matthew Neal, Fairfield, OH (US); Brian Andrew Kendall, Maineville, OH (US); Murray Fullerton, Papakura (NZ)

(73) Assignee: PAC Worldwide Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,456

(22) Filed: Feb. 16, 2024

(65) Prior Publication Data

US 2024/0308170 A1 Sep. 19, 2024

Related U.S. Application Data

(63) Continuation of application No. 17/372,351, filed on Jul. 9, 2021.

(Continued)

(51) Int. Cl.

*B31F 1/28* (2006.01)
*B31B 70/00* (2017.01)

(Continued)

(52) U.S. Cl.

CPC .......... *B31F 1/2863* (2013.01); *B31B 70/252* (2017.08); *B65D 65/403* (2013.01); *B31B 2170/30* (2017.08); *B31F 2201/0733* (2013.01)

(58) Field of Classification Search

CPC ......... B31B 2170/30; B31B 2201/0733; B31F 1/28; B31F 1/2863; B31F 70/252;

(Continued)

(56) References Cited

U.S. PATENT DOCUMENTS

| | | | |
|---|---|---|---|
| 367,527 | A | 8/1887 | Keene |
| 956,540 | A | 5/1910 | Norton |

(Continued)

FOREIGN PATENT DOCUMENTS

| | | | |
|---|---|---|---|
| CN | 102527798 | A | 7/2012 |
| EP | 0150913 | A2 | 8/1985 |

(Continued)

OTHER PUBLICATIONS

Stewart, "Ingenious Cardboard Packaging Folds to Fit Parcels of Any Shape," Aug. 30, 2014, URL=https://inhabitat.com/ingenious-cardboard-packaging-folds-to-fit-any-shapei, retrieved on Aug. 23, 2023. (4 pages).

(Continued)

*Primary Examiner* — Bryon P Gehman
(74) *Attorney, Agent, or Firm* — McLane Middleton, Professional Association

(57) ABSTRACT

The present disclosure is directed to a shipping container with a corrugated medium that lines an interior pocket of the shipping container as well devices and components (e.g., corrugating rollers, corrugating machines, scoring rollers, and scoring machines) that are utilized to manufacture the shipping containers. The corrugated medium has flutes that cushion, support, and protect a product that is shipped within the shipping container. The corrugated medium may include a first portion with first flutes and a second portion with second flutes that are offset relative to the first flutes. The offset first flutes and second flutes results in peaks of the first (Continued)

flutes nesting within valleys of the second flutes, and peaks of the second flutes nesting within valleys of the first flutes.

20 Claims, 25 Drawing Sheets

Related U.S. Application Data

(60) Provisional application No. 63/127,911, filed on Dec. 18, 2020, provisional application No. 63/051,077, filed on Jul. 13, 2020.

(51) Int. Cl.
*B65D 65/40* (2006.01)
*B31B 170/30* (2017.01)

(58) Field of Classification Search
CPC ...... B65D 65/40; B65D 65/403; B65D 81/03; B65D 2565/385
USPC .......................................... 206/521, 583–594
See application file for complete search history.

(56) References Cited

U.S. PATENT DOCUMENTS

| | | | | |
|---|---|---|---|---|
| 1,987,461 | A | | 1/1935 | Bocye |
| 2,503,874 | A | | 4/1950 | Ives |
| 2,791,369 | A | | 5/1957 | Paige |
| 3,144,979 | A | | 8/1964 | Young |
| 3,281,050 | A | | 10/1966 | Suchodolski |
| 3,419,937 | A | | 1/1969 | Bally |
| 3,501,084 | A | | 3/1970 | Harrison |
| 3,513,054 | A | | 5/1970 | Rene |
| 3,743,173 | A | | 7/1973 | Lasker |
| 3,746,593 | A | | 7/1973 | Majewski |
| 3,866,750 | A | | 2/1975 | Collin |
| 3,896,650 | A | | 7/1975 | O'Konski |
| 4,059,220 | A | * | 11/1977 | Lorenz ................. B65D 5/0227 229/199 |
| 4,153,664 | A | | 5/1979 | Sabee |
| 4,174,803 | A | | 11/1979 | Shrontz et al. |
| 4,344,379 | A | | 8/1982 | Roberts |
| 4,363,616 | A | | 12/1982 | Thomas |
| 4,531,996 | A | | 7/1985 | Sukenik |
| 4,589,552 | A | | 5/1986 | Chevalier |
| 4,693,413 | A | | 9/1987 | McFarland et al. |
| 4,809,904 | A | | 3/1989 | Yasutaniya |
| 4,853,072 | A | | 8/1989 | Thompson |
| 5,096,407 | A | | 3/1992 | Nebeling |
| 5,188,265 | A | | 2/1993 | Capy |
| 5,690,601 | A | | 11/1997 | Cummings et al. |
| 5,693,167 | A | | 12/1997 | Cahill et al. |
| 5,794,758 | A | | 8/1998 | Bakker et al. |
| 6,461,559 | B1 | | 10/2002 | Bar |
| 6,782,933 | B2 | | 8/2004 | Marschke |
| 6,820,799 | B2 | | 11/2004 | Makofsky et al. |
| 6,902,103 | B2 | | 6/2005 | Machery |
| 8,562,216 | B2 | | 10/2013 | Kendall et al. |
| 8,877,321 | B2 | | 11/2014 | Andriessen et al. |
| 10,363,717 | B2 | | 7/2019 | Greenfield |
| 10,457,010 | B2 | | 10/2019 | Schell et al. |
| 10,974,413 | B2 | | 4/2021 | Webster |
| 2008/0178965 | A1 | | 7/2008 | Kube et al. |
| 2009/0247382 | A1 | * | 10/2009 | Bussey, III ............ B31D 5/006 493/464 |
| 2011/0177299 | A1 | | 7/2011 | Van Berlo |
| 2019/0315511 | A1 | * | 10/2019 | Garner ................. B65D 5/0209 |
| 2020/0254571 | A1 | * | 8/2020 | Garner ................. B65D 5/0227 |

FOREIGN PATENT DOCUMENTS

| | | | |
|---|---|---|---|
| EP | 1101704 | A2 | 5/2001 |
| EP | 2027993 | A1 | 2/2009 |
| EP | 2492203 | A1 | 8/2012 |
| GB | 2432148 | A | 5/2007 |
| GB | 2432148 | B | 9/2009 |
| JP | S5458595 | A | 5/1979 |
| JP | 2010208310 | A | 9/2010 |
| MX | 2017009706 | A | 2/2019 |
| WO | WO 2010025751 | A1 | 3/2010 |
| WO | WO 2019210046 | A1 | 10/2019 |
| WO | WO 2022015603 | A1 | 1/2022 |

OTHER PUBLICATIONS

Kato Fastening Systems, "Coarse Threads vs Fine Threads," https://katofastening.com/article/coarsevsfine.html#:~:text=Fine%20threads%20have%20less%20tendency,a%20set%20under%20vibration%20conditions, first available Apr. 7, 2018. (2 pages).

* cited by examiner

CONFORMABLE, RECYCLABLE SHIPPING CONTAINER, MACHINE AND METHOD

BACKGROUND

Technical Field

The present disclosure is directed to embodiments of a shipping container and embodiments of methods of manufacturing the shipping container as well as embodiments of components and devices (e.g., corrugated rollers, scoring rollers, corrugation machines) utilized manufacturing the shipping containers of the present disclosure.

Description of the Related Art

Retailers (e.g., online retailers, brick-and-mortar retailers, specialty retailers, etc.) ship thousands of products that are sold to buyers and consumers on a regular basis either in-person, over the phone, or through a website. These products (e.g., an object, an item, an electronic device, a candle, an article of clothing, a beverage can, a beverage container, etc.) come in any number of different shapes or sizes. Some of these products, such as candles, may come in outer containers such as a jar, which may be made of glass. These products are placed within a conventional shipping container that protects the product reducing a likelihood of the product breaking during shipping.

Shipping costs of these products utilizing conventional shipping containers to ship the products may be determined by a total volume of a conventional shipping container and a product within the conventional shipping container. As shipping costs may be determined by volume, retailers try to utilize conventional shipping containers that are relatively flat and only slightly larger than the product itself to reduce the total volume of the product and the conventional shipping container in which the product is present.

Shipping costs of these products utilizing conventional shipping containers to ship the products may be determined by a total weight of a conventional shipping container and a product within the conventional shipping container. As shipping costs may be determined by weight, retailers utilize conventional shipping containers that are lightweight. For example, retailers may utilize conventional shipping containers known as conventional bubble mailers to ship or send products to customers. Usually, conventional bubble mailers are made of multiple materials, such as paper and plastic.

Since these conventional bubble mailers are made of plastic and paper, these bubble mailers can be recycled if the components or materials are manually separated and delivered to a recycling facility that recycles the components or materials. However, most customers, consumers, or buyers are unaware that these materials must be separated to be properly recycled, which results in many conventional bubble mailers used today ending up in landfills harming the environment and the planet.

The conventional bubble mailers have air bubbles, which are similar to "bubble wrap," within the conventional bubble mailers. These air bubbles cushion and protect the product in the conventional bubble mailer reducing the likelihood of the product breaking when being shipped to the consumer, customer, or buyer.

In some other conventional shipping containers, a plurality of flutes may be present internally within the conventional shipping container reducing a likelihood of the product breaking while shipping the product to the consumer, customer, or buyer. In other words, similar to the air bubbles of the bubble mailer, the flutes cushion and protect the product during shipping.

As products shipped by retailers come in many different sizes and shapes (e.g., cylindrical, square, rectangular, triangular, etc.), retailers generally buy and store a few standardized sized conventional shipping containers to ship these products to a buyer. For example, a retailer may buy and store first conventional shipping containers having a first volume as well as second conventional shipping containers with a second volume that is larger than the first volume. In other words, the first shipping containers may be utilized to ship smaller objects relative to larger objects shipped in the second shipping containers.

Storage costs for storing conventional shipping containers increases as the conventional shipping containers become larger. For example, the cost of storing the first conventional shipping containers is smaller relative to the cost of storing the second conventional shipping containers as the first conventional shipping containers are smaller than the second conventional shipping containers.

These storage costs increase as a number of conventional shipping containers to be stored increases as well. For example, a larger retailer that ships a greater number of products relative to a smaller retailer may have a greater number of conventional shipping containers that must be stored relative to the smaller retailer. In this situation, the larger retailer would usually have greater storage costs relative to the smaller retailer as the larger retailer is storing a greater number of the conventional shipping containers. In other words, these storage costs are determined by an amount of volume taken up by the shipping containers when stored and awaiting to be utilized to ship a product out to the consumer, customer, or buyer.

Similar to how shipping costs of a product in a conventional shipping container is determined by volume, weight, or a combination of both, shipping costs of empty shipping containers to a retailer is determined by volume, weight, or a combination of both. For example, usually, the conventional shipping containers are shipped in the least number of boxes and containers as possible to the retailer to reduce shipping costs of the conventional shipping containers themselves. As the number of boxes or containers holding the conventional shipping containers increases when shipping the conventional shipping containers to the retailer, the shipping costs to ship the conventional shipping containers themselves increases as well.

BRIEF SUMMARY

The present disclosure is directed to at least one embodiment of a shipping container that includes at least a corrugated medium having a plurality of flutes adhered to an outer liner. The corrugated medium and outer liner are configured to be selectively bent and folded in directions aligned and not aligned with flutes of the corrugated medium. This bendability or flexibility of the corrugated medium with the flutes enables the corrugated medium and the outer liner to easily and closely conform to a product placed adjacent to the corrugated medium. In other words, the shipping container of the present disclosure readily conforms to the shape of the product.

In some embodiments, to provide the shipping container of the present disclosure with the bendability, foldability, and, ultimately, conformability, such that the shipping container of the present disclosure more readily conforms to a product, the corrugated medium may have a plurality of score lines that extend along, across, and through the plurality of flutes of the corrugated medium. These scoring lines increase the bendability, the flexibility, the foldability, and the conformability of the flutes and the shipping containers of the present disclosure as a whole.

This greater bendability, foldability, and conformability allows the shipping containers of the present disclosure to readily conform to a product positioned within the shipping containers of the present disclosure. This ability of the shipping containers of the present disclosure to conform to the shape of the products placed in the shipping containers reduces the shipping costs of the product. For example, a first total volume of the product and one of the shipping containers of the present disclosure in which the product is present is less than a second total volume of the same product in shipping containers that does not implement embodiments of the present disclosure. Therefore, shipping the product in one of the shipping containers of the present disclosure costs less than shipping the same product in shipping containers that does not implement embodiments of the present disclosure.

In some embodiments, the shipping containers of the present disclosure include a first panel and a second panel opposite to the first panel. The first panel includes a first corrugated medium coupled to an outer liner. The second panel includes a second corrugated medium coupled to the outer liner. The first corrugated medium and the second corrugate medium are spaced apart from each other. Folding the outer liner onto itself forms embodiments of ones of the shipping containers of the present disclosure.

In some embodiments, when the outer liner is folded onto itself, first flutes of the first corrugated medium are offset relative to second flutes of the second corrugated medium such that the first flutes nest within the second flutes and vice versa. For example, the first flutes include first peaks and first valleys, and the second flutes include second peaks and second valleys. The first peaks of the first flutes are received by ones of the second valleys of the second flutes, and the second peaks of the second flutes are received by ones of the first valleys of the first flutes due to this offset of the first flutes relative to the second flutes. This offset configuration of the first and second flutes of the first and second corrugated mediums, respectively, reduces the overall thickness of the shipping containers of the present disclosure when compressed flat relative to shipping containers where the flutes do not nest within each other when the shipping containers are compressed flat. This offset configuration of the first and second flutes results in shipping containers that can be shipped to a retailer in fewer boxes or containers, thereby reducing the overall shipping costs to ship the shipping containers to the retailer.

In some embodiments, the shipping containers of the present disclosure are made entirely of a paper material. In some embodiments, the shipping containers of the present disclosure are made entirely of a plastic material.

Unlike the conventional shipping containers that are generally made of multiple materials (e.g., plastic and paper such as the conventional bubble mailers) that have to be broken apart to recycle the conventional shipping containers, some embodiments of the shipping containers of the present disclosure may be entirely composed of paper materials such that these embodiments of the shipping containers of the present disclosure do not have to be broken down into various materials to be recycled. In other words, the consumer, customer, or buyer may readily recycle these embodiments of the shipping containers of the present disclosure by simply placing these embodiments of the shipping containers of the present disclosure into a recycling bin without any processing beforehand.

The shipping containers of the present disclosure with flutes that line an interior pocket of the shipping containers of the present disclosure may be formed by corrugating rollers of the present disclosure.

In at least one embodiment of a corrugating roller of the present disclosure, the corrugating roller includes a first end and a second end opposite to the first end. The corrugating roller includes first regions and second regions along an outer surface of the corrugating roller. The first regions may be flat regions and the second regions may be a plurality of “B” sized flute regions at which a plurality of “B” sized flutes are located. The first regions (e.g., flat regions, flat surfaces, etc.) extend from the first end to the second end. The second regions (e.g., flute regions, flute surfaces) extend from the first end to the second end. The flutes at the second regions are horizontally aligned based on the orientation of the corrugating roller. The flutes at the second regions extend from the first end to the second end.

In at least one embodiment of a corrugating roller of the present disclosure, the corrugating roller includes first regions, second regions, third regions, and fourth regions along an outer surface of the corrugating roller. The first regions are flat (e.g., flat surface, flat region, etc.), and the second, third, and fourth regions have flutes and may be referred to as fluted regions (e.g., regions with groups of flutes). The flutes at the second regions are offset with respect to the flutes at the third regions, and the flutes at the fourth regions separate the flutes at the second regions from the flutes at the third regions. The flutes at the fourth region are transverse to the flutes at the second region and the third regions. The offset of the flutes at the second regions and the third regions form the offset flutes of embodiments of the shipping container as discussed earlier.

BRIEF DESCRIPTION OF THE SEVERAL VIEWS OF THE DRAWINGS

For a better understanding of the embodiments, reference will now be made by way of example to the accompanying drawings.

In the drawings, identical reference numbers identify similar elements or acts unless the context indicates otherwise.

Figure 1A:
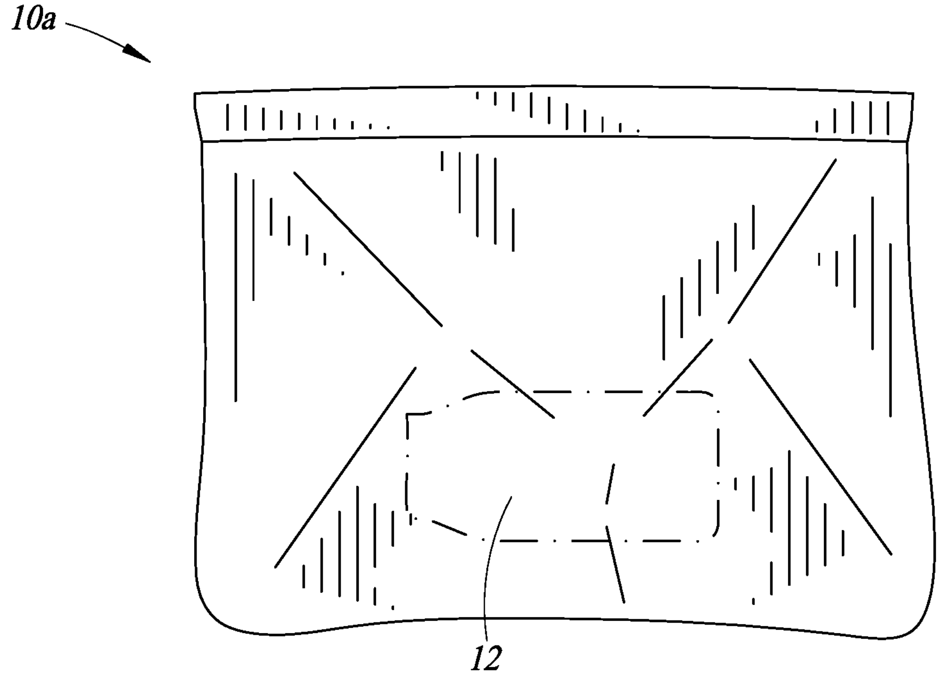

The sizes and relative proportions of the elements in the drawings are not necessarily drawn to scale. For example, some of these elements may be enlarged and positioned to improve drawing legibility.

Figure 1B:
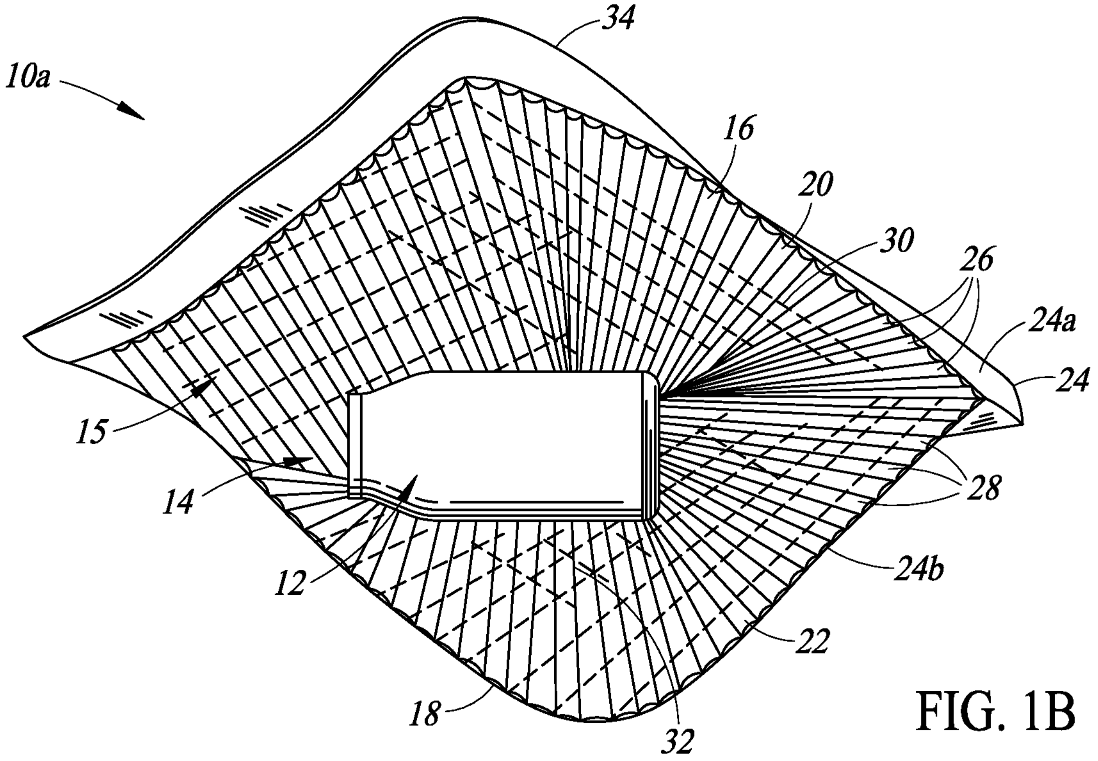
Figure 1C:
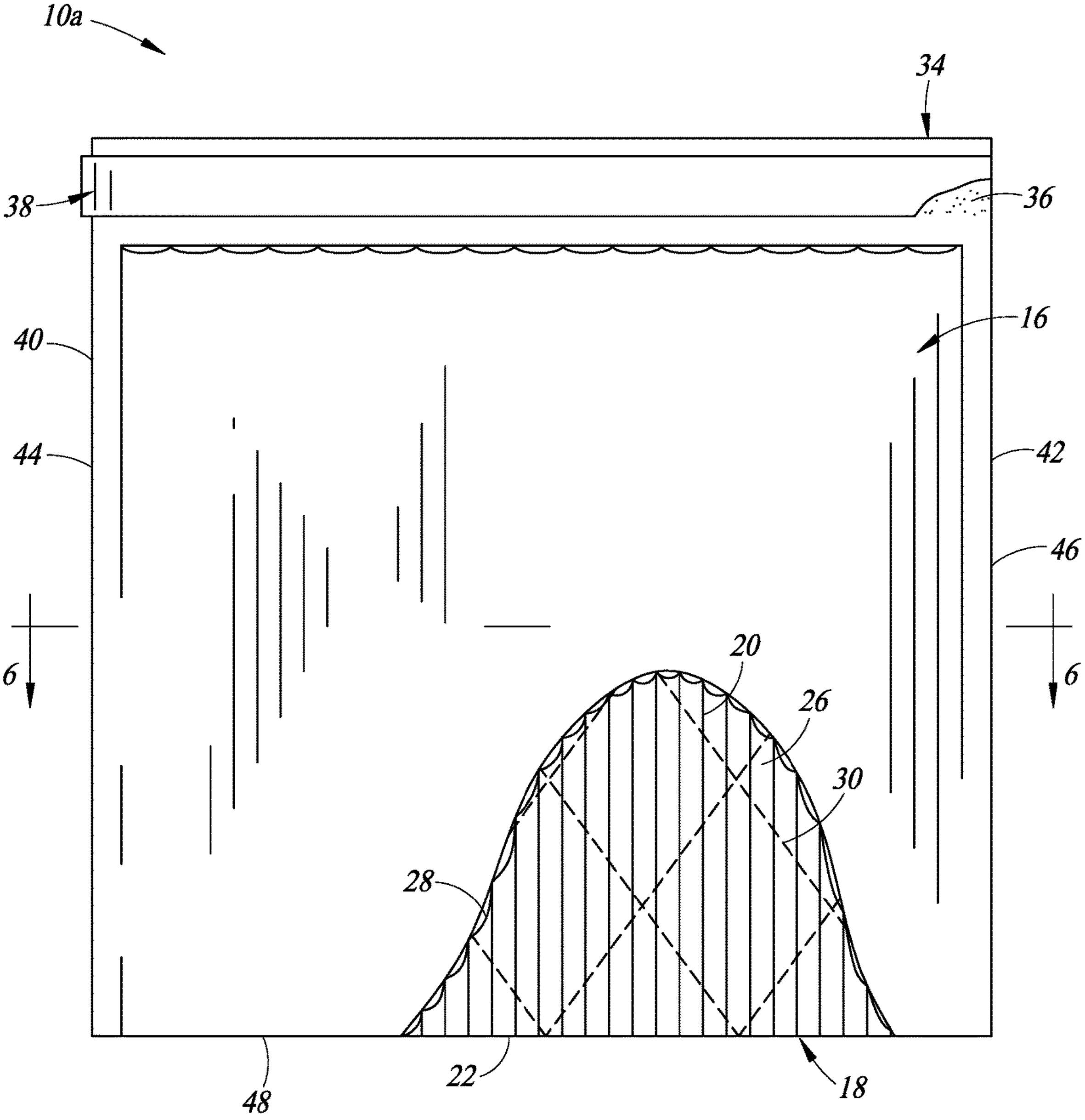
Figure 1D:
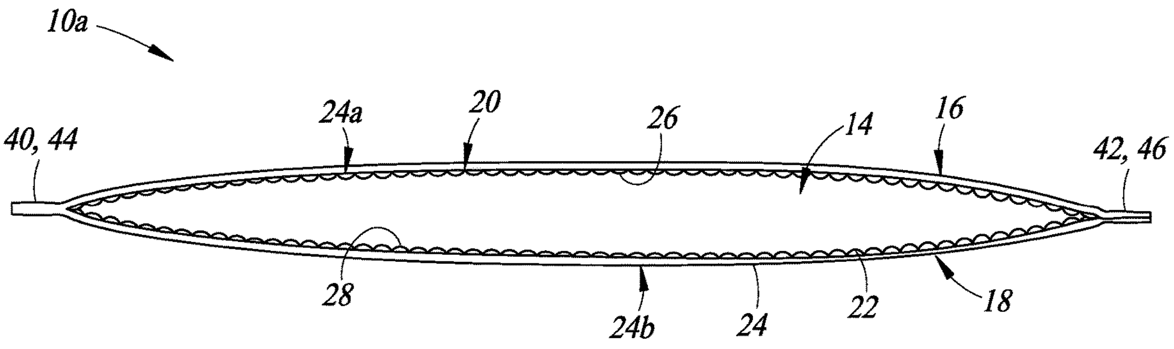
Figure 1E:
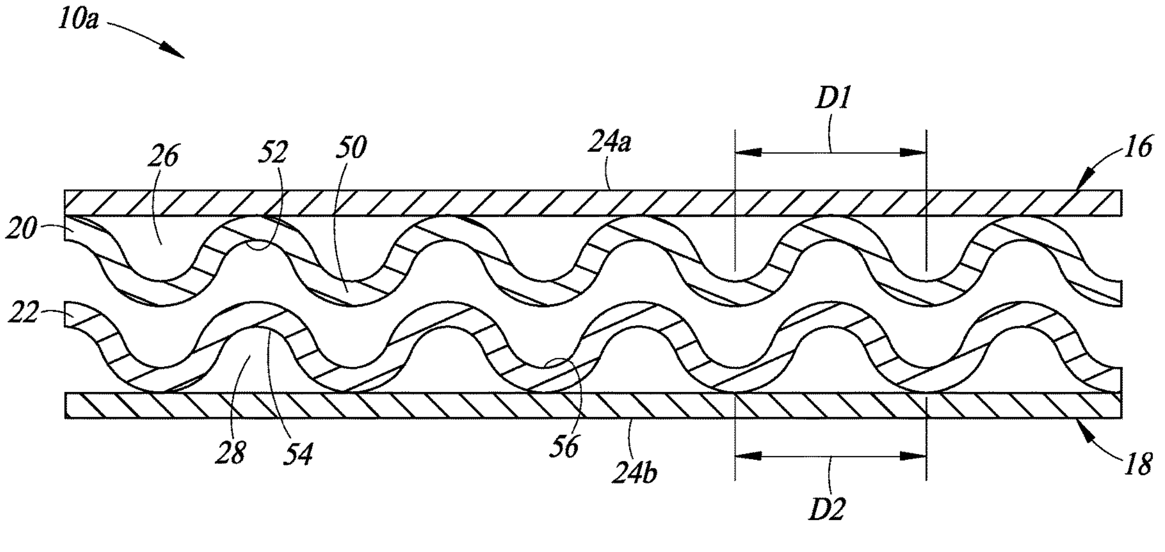
Figure 2:
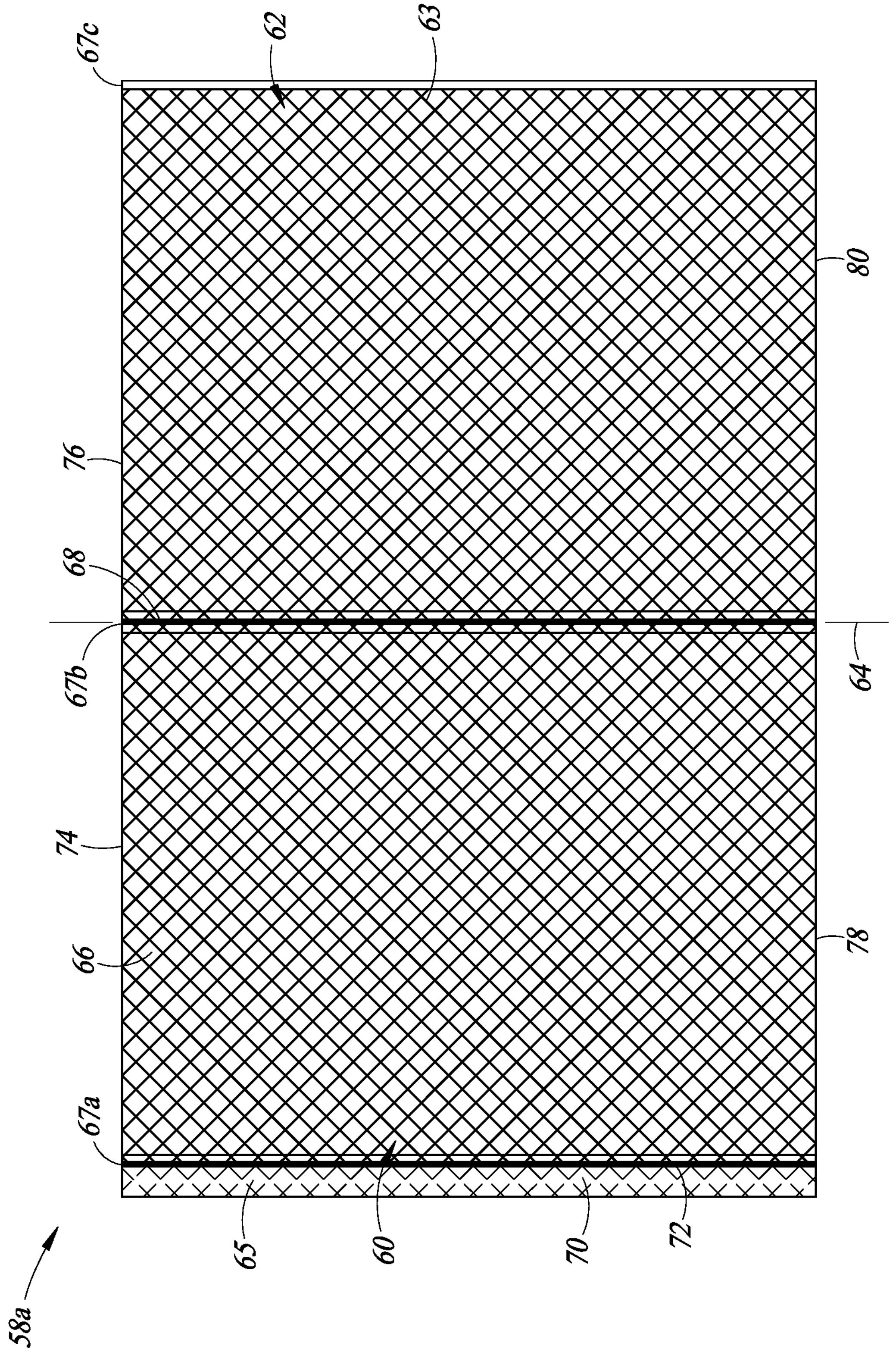
Figure 3:
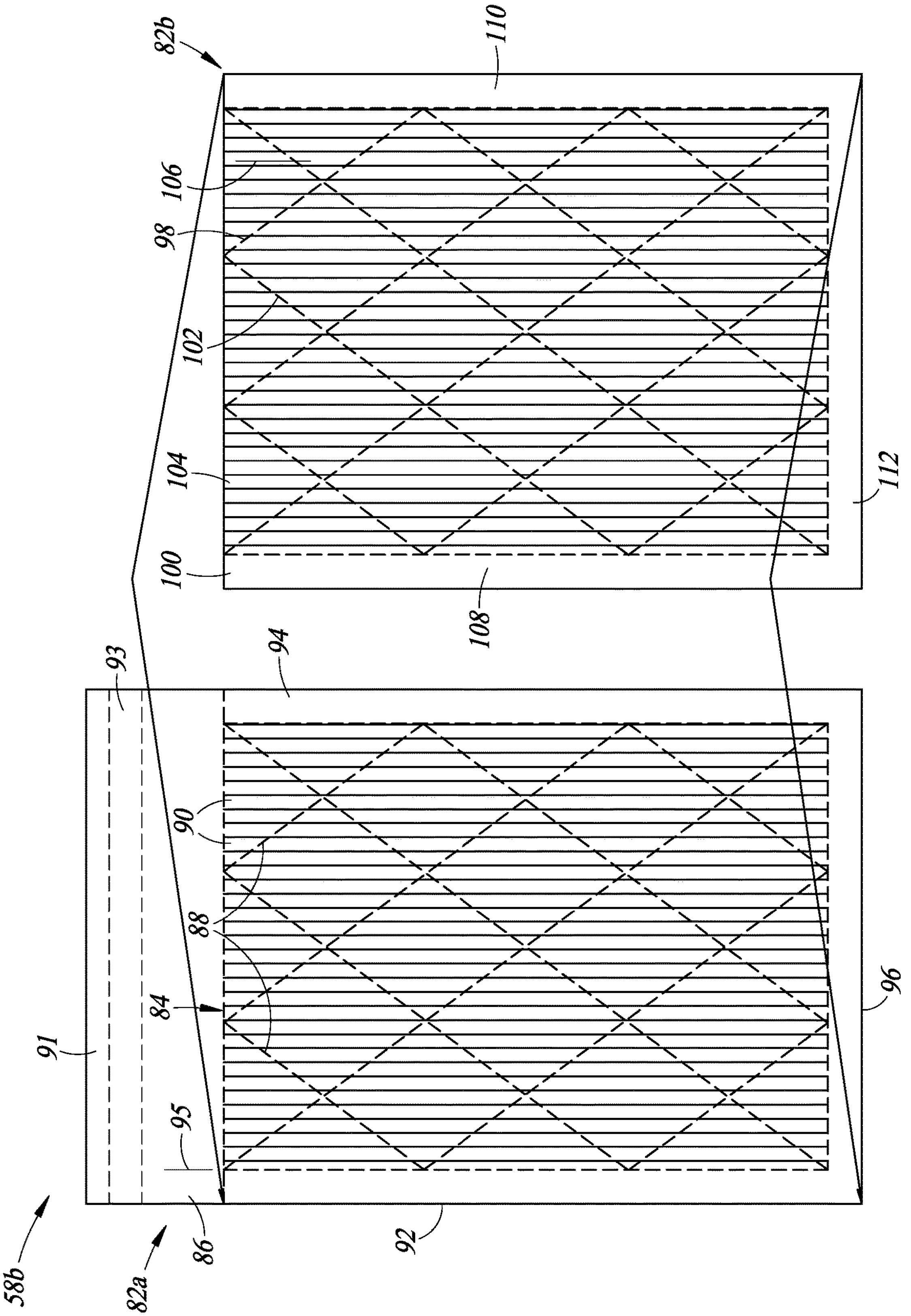
Figure 5A:
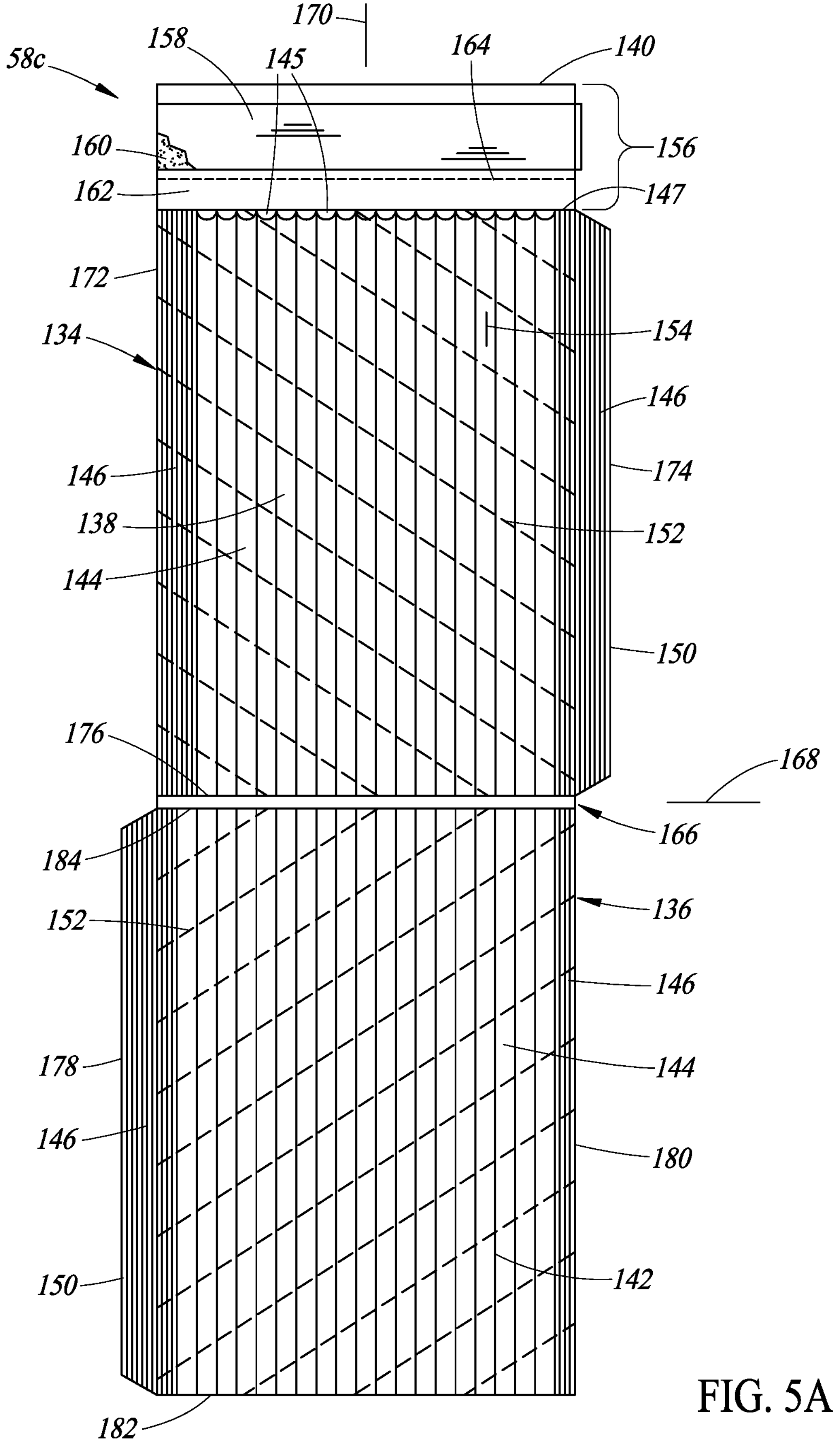
Figure 5B:
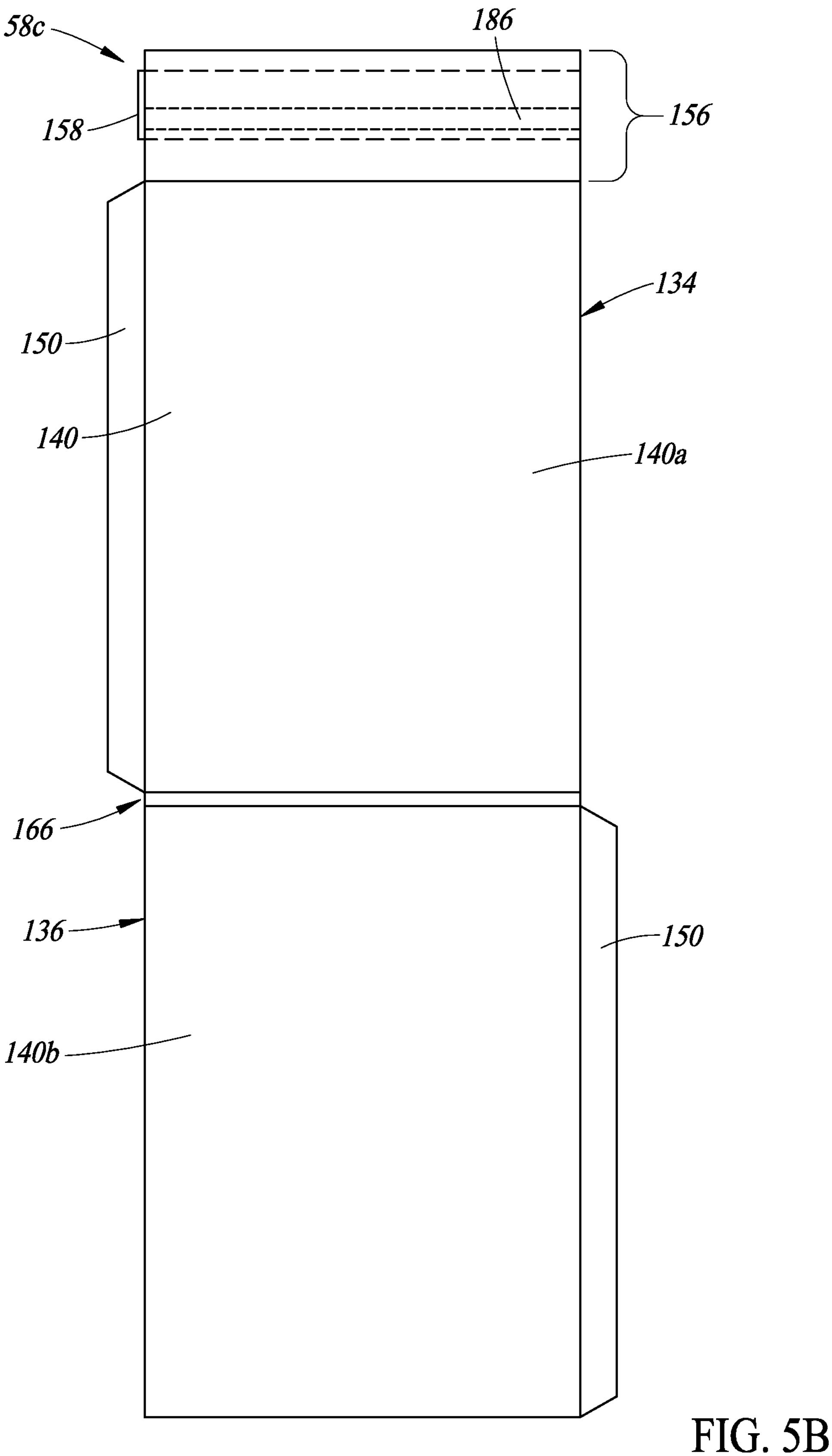
Figure 5C:
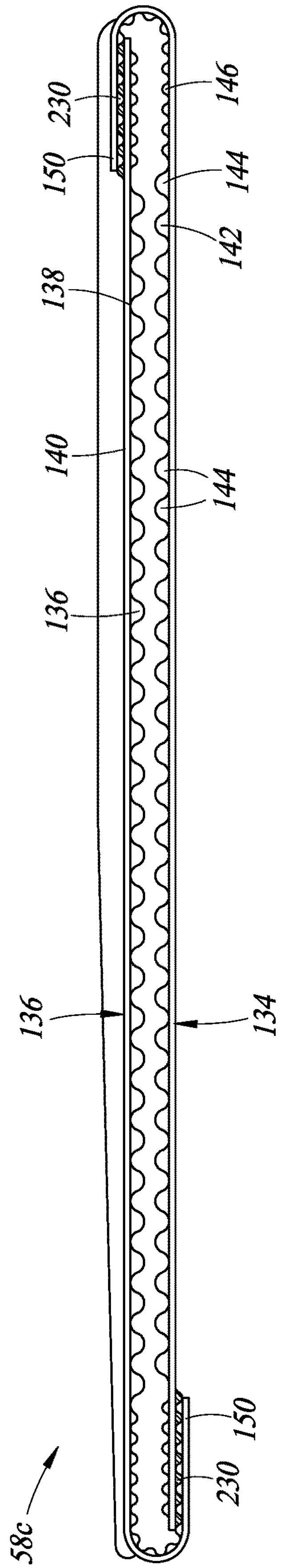
Figure 6:
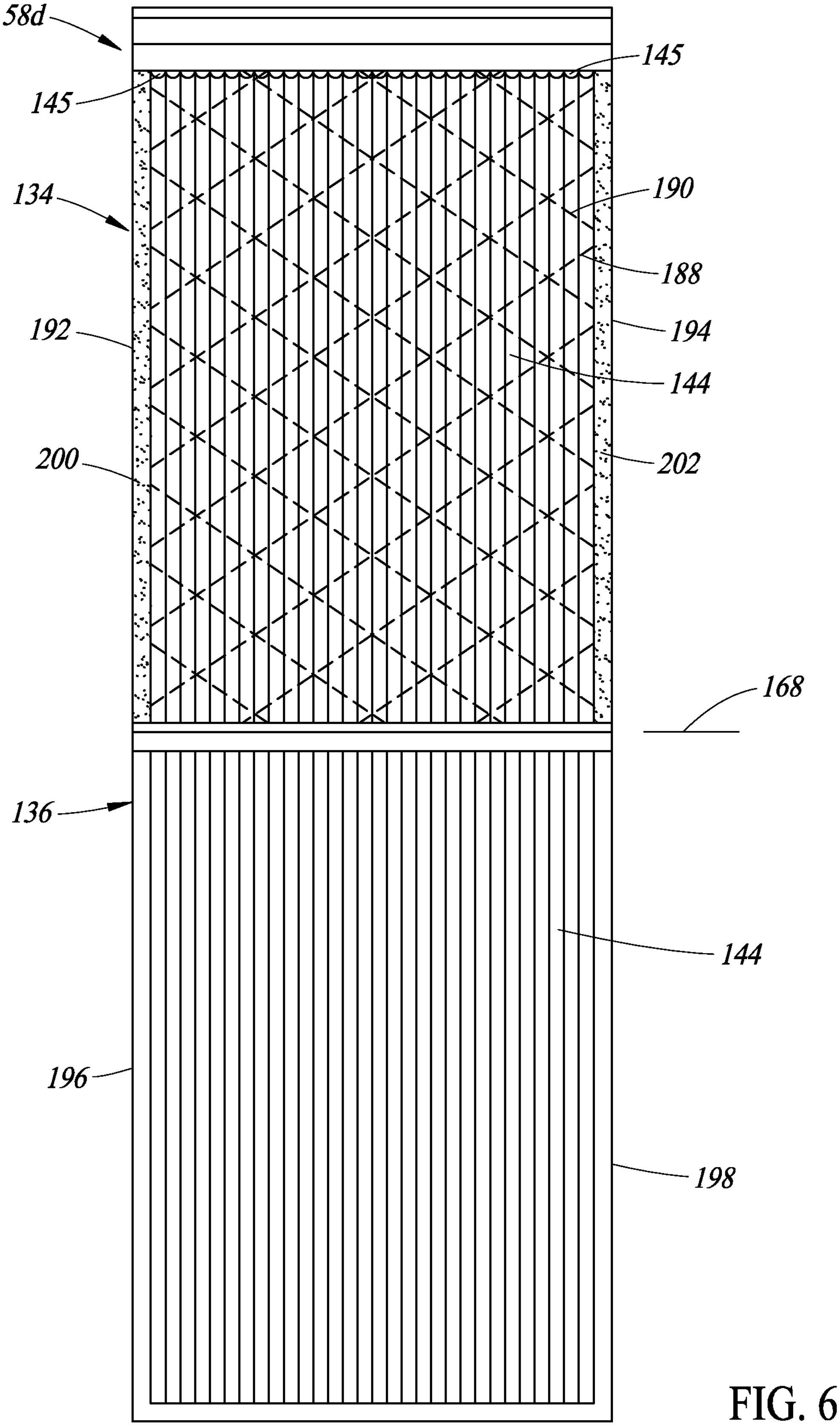
Figure 7:
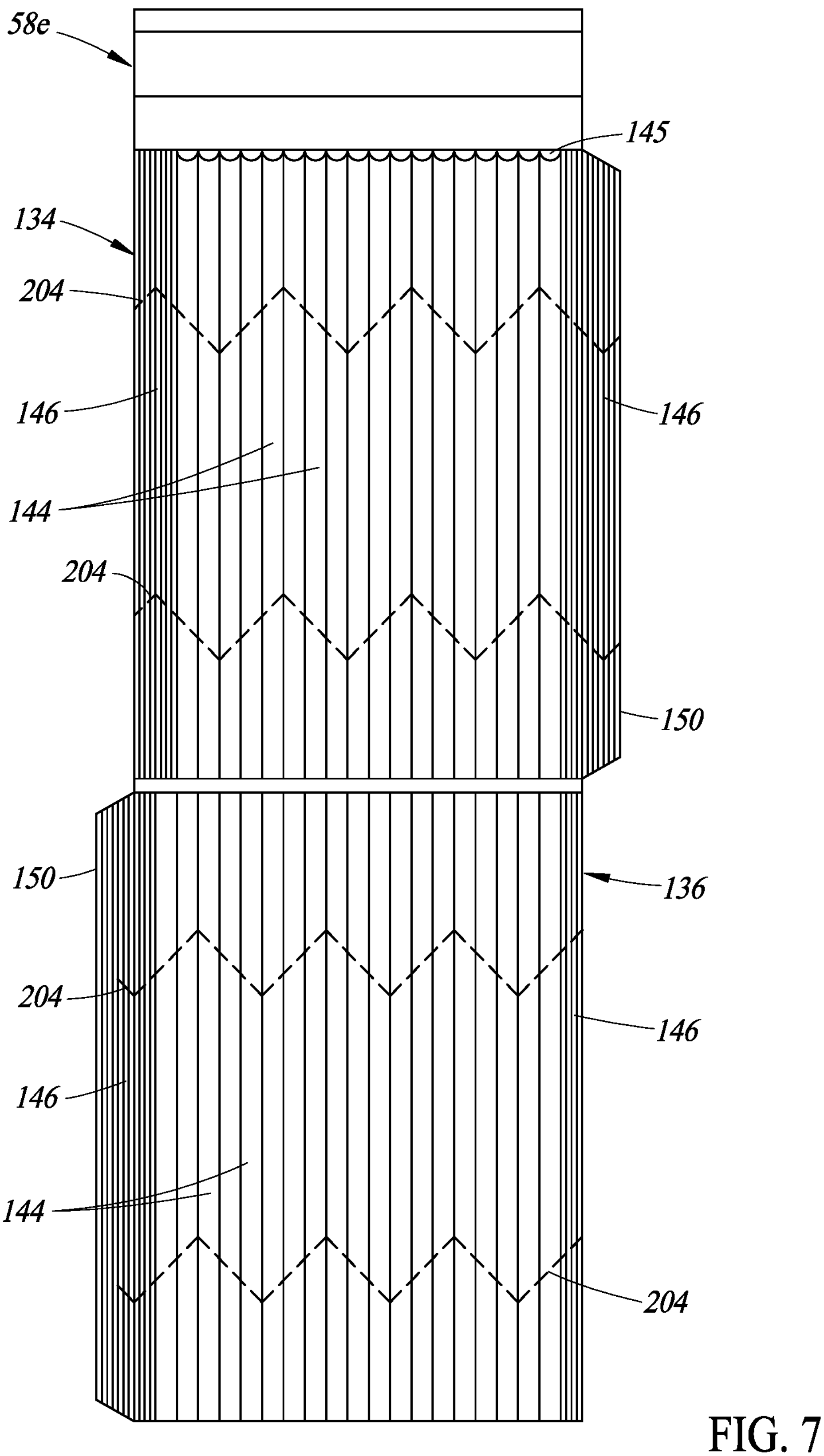
Figure 8:
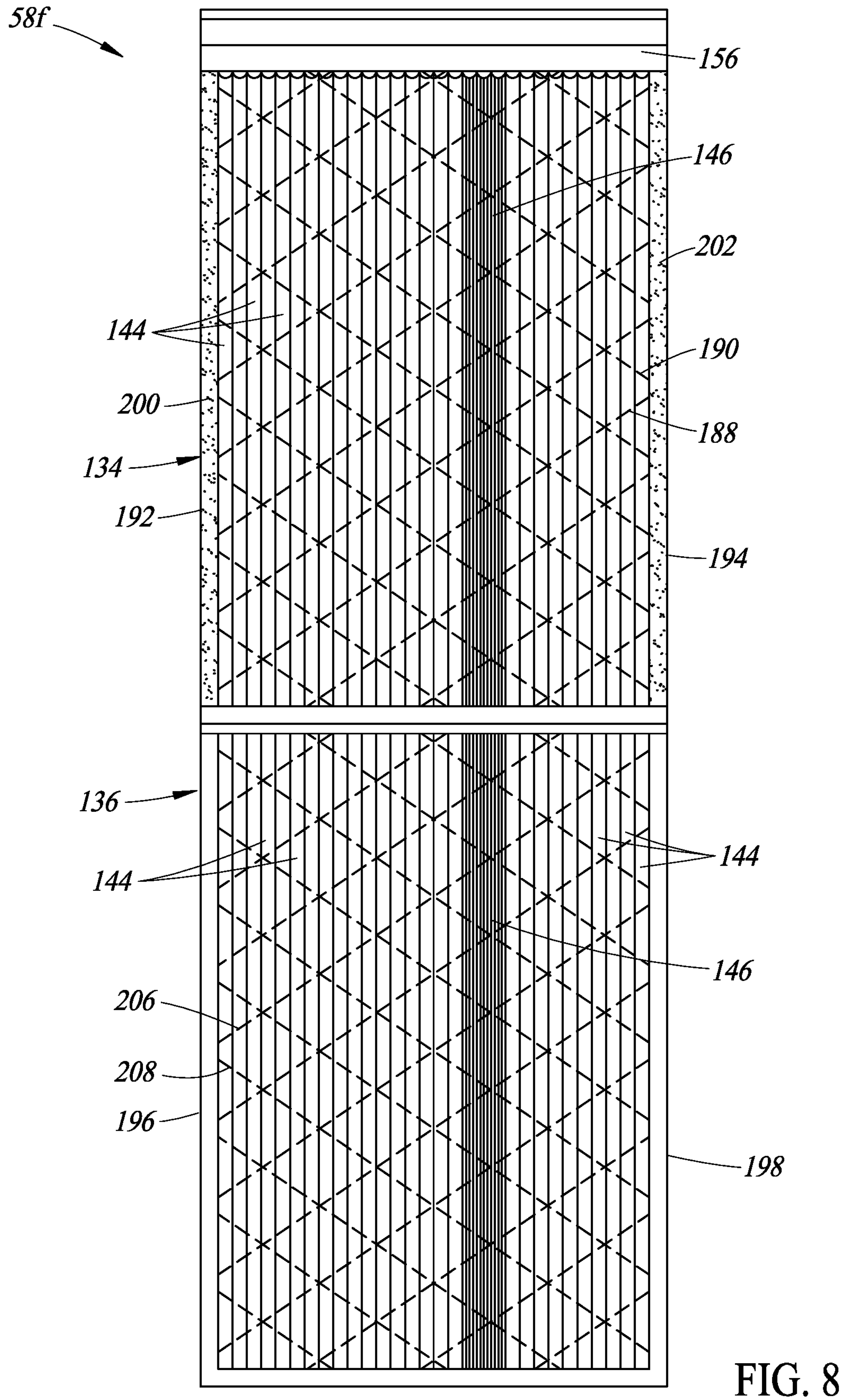
Figure 9A:
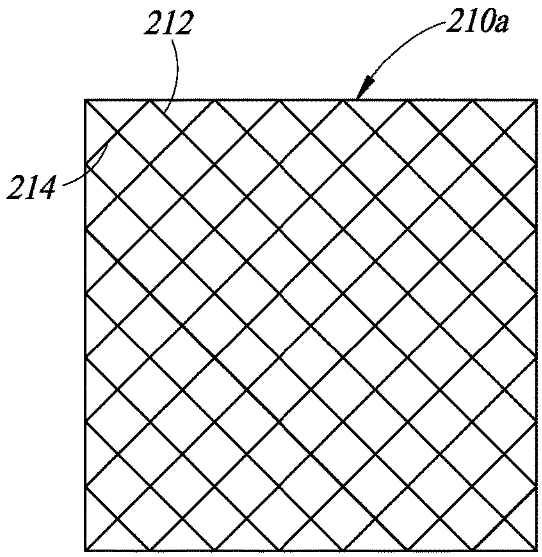
Figure 9B:
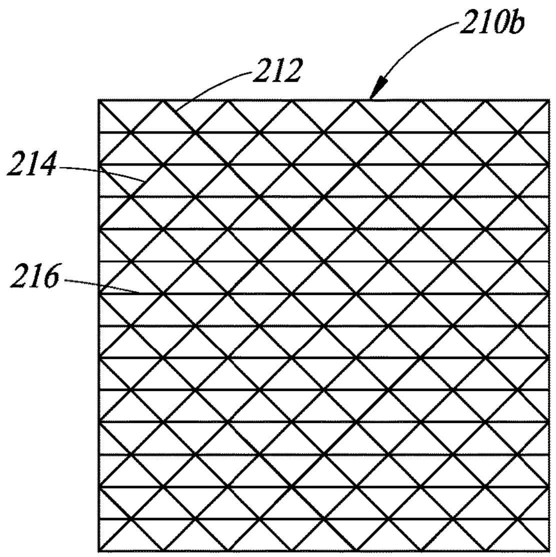
Figure 9C:
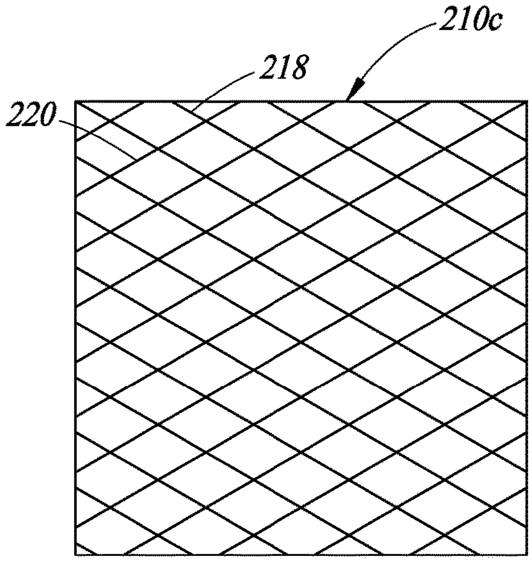
Figure 9D:
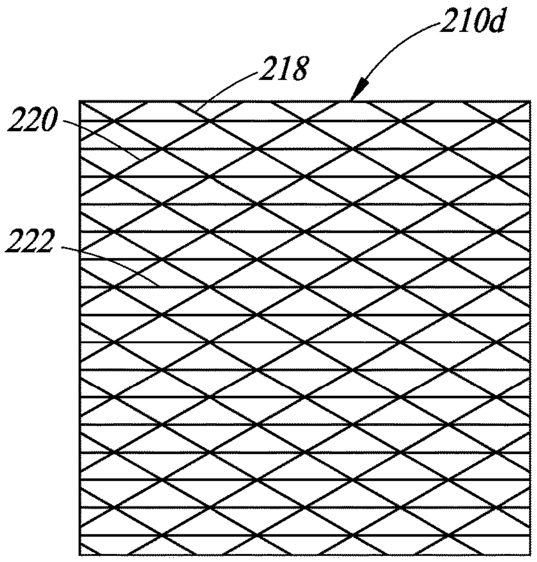
Figure 10A:
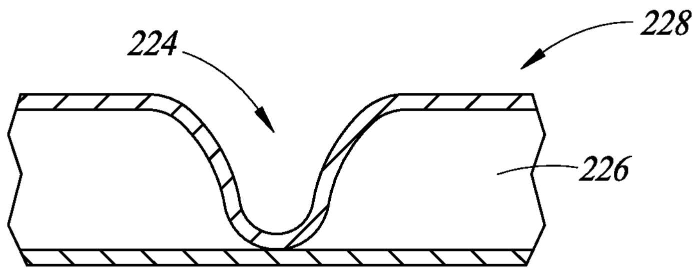
Figure 10B:
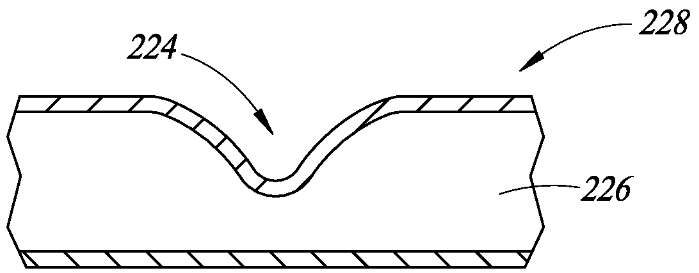
Figure 10C:
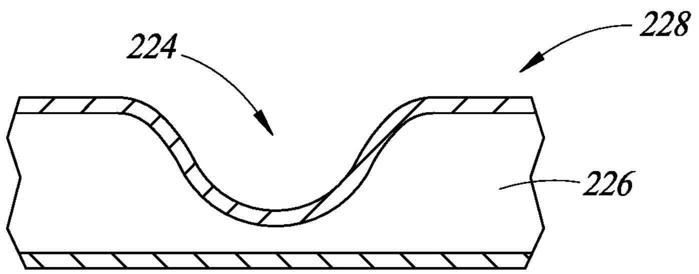
Figure 12A:
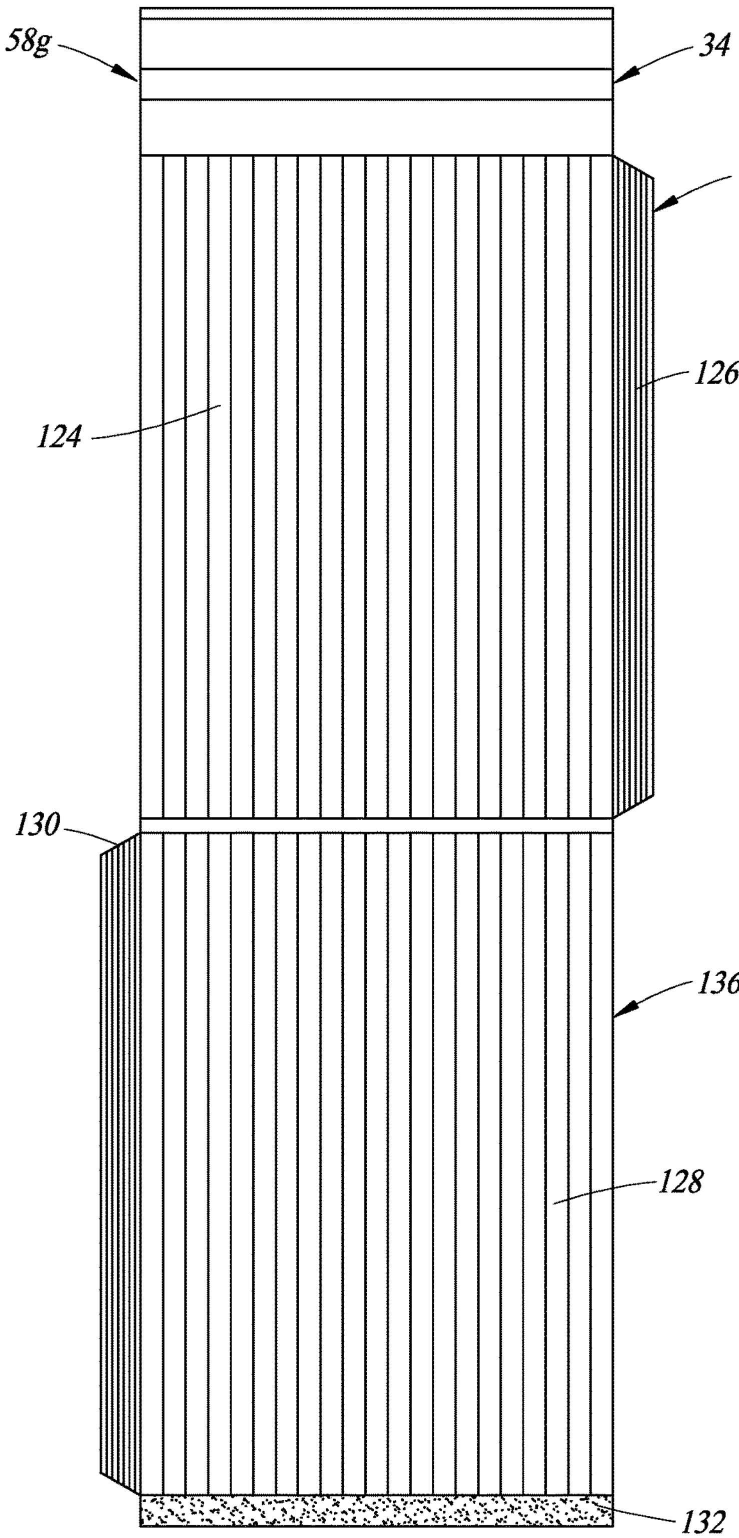
Figure 12B:
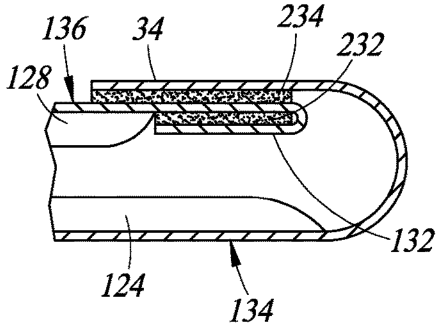
Figure 13:
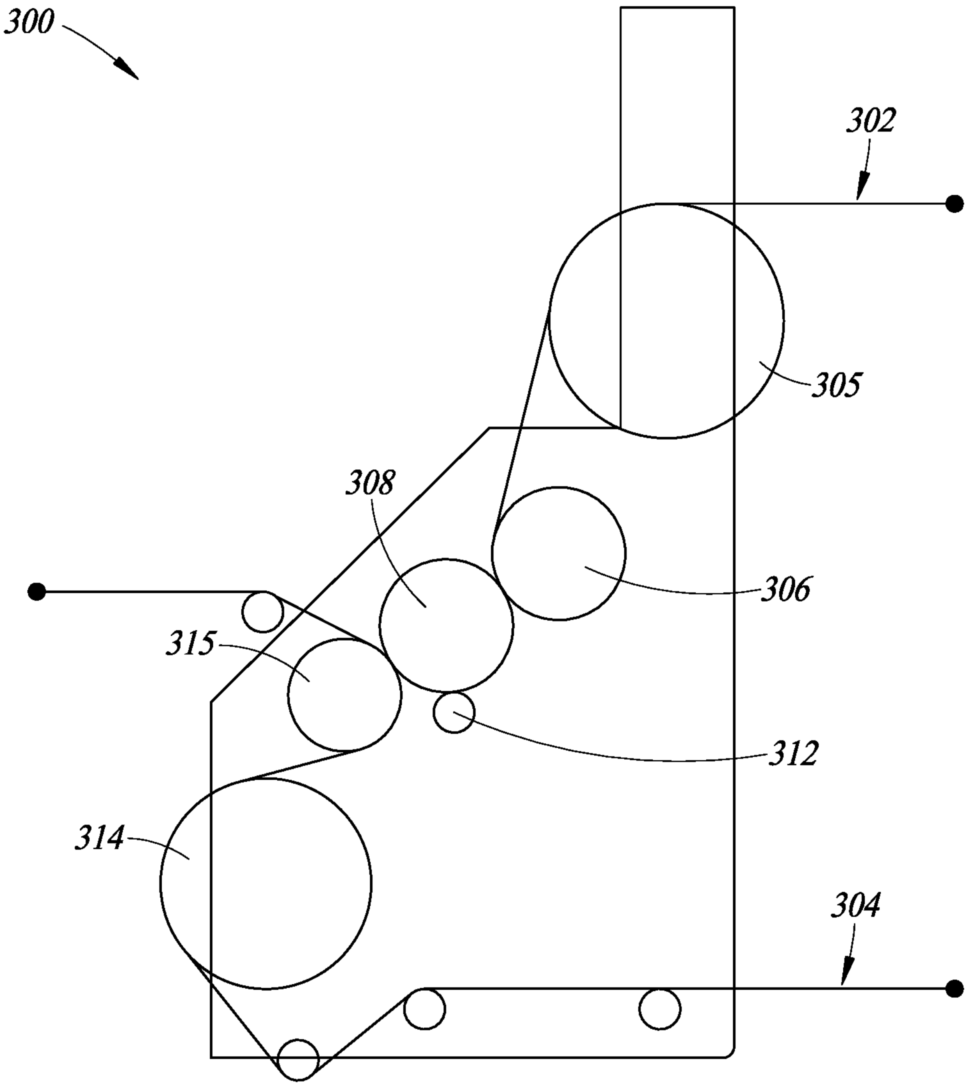
Figure 14A:
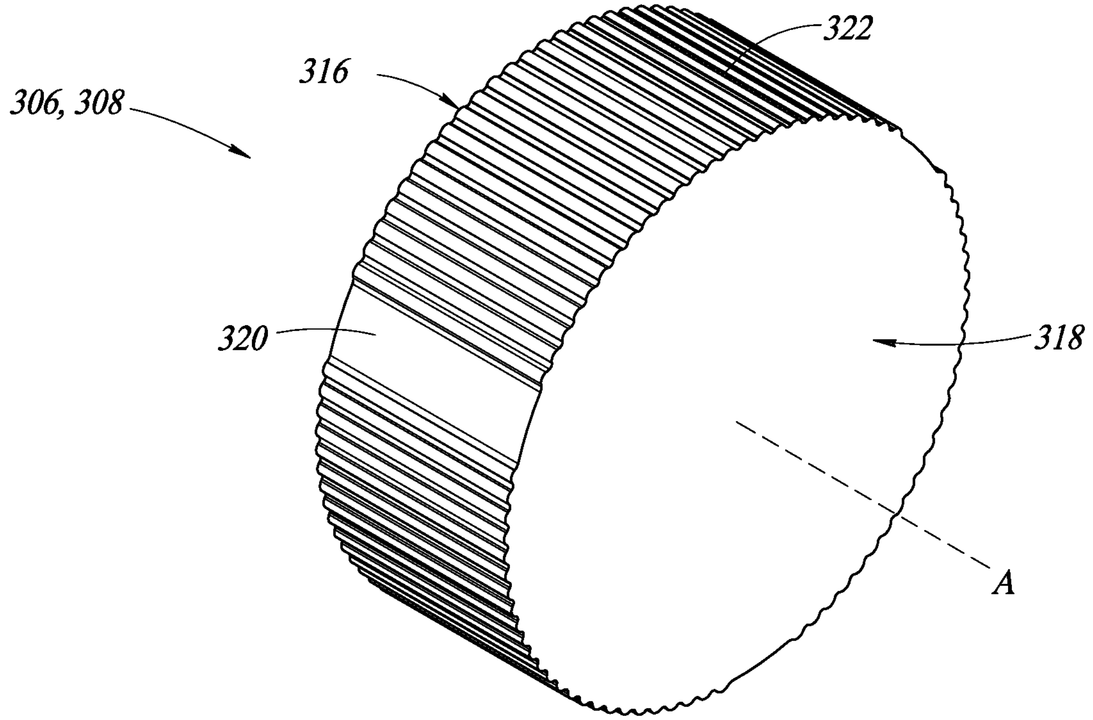
Figure 14B:
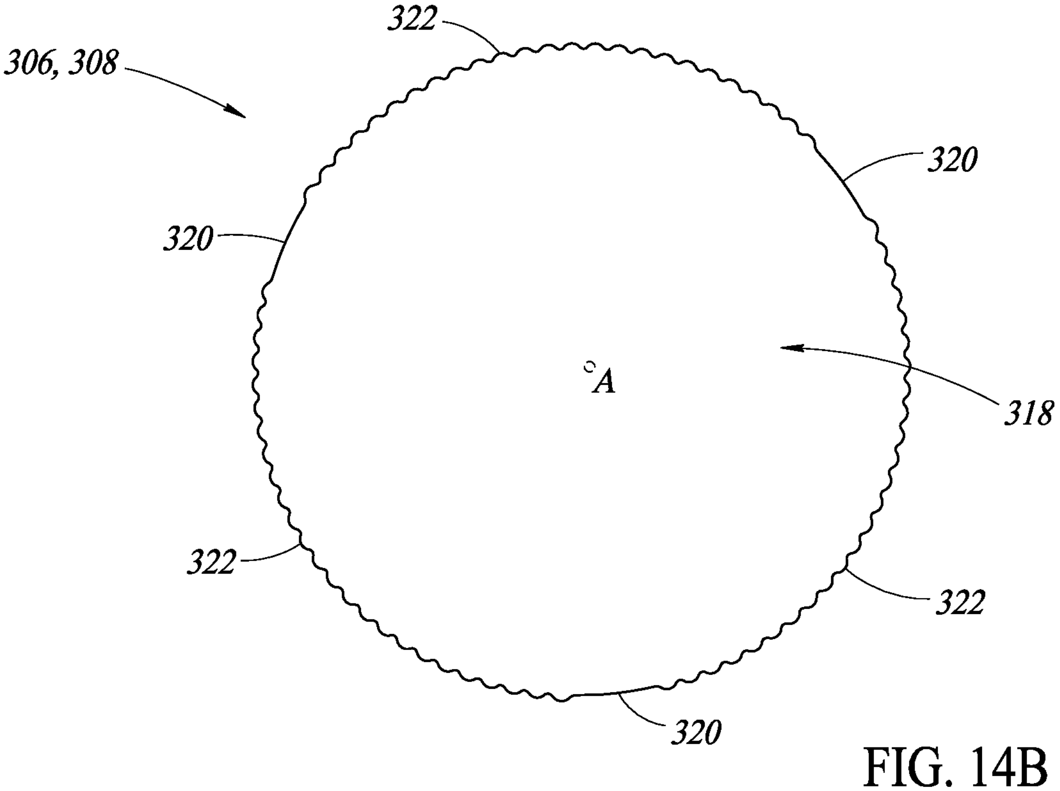
Figure 14C:
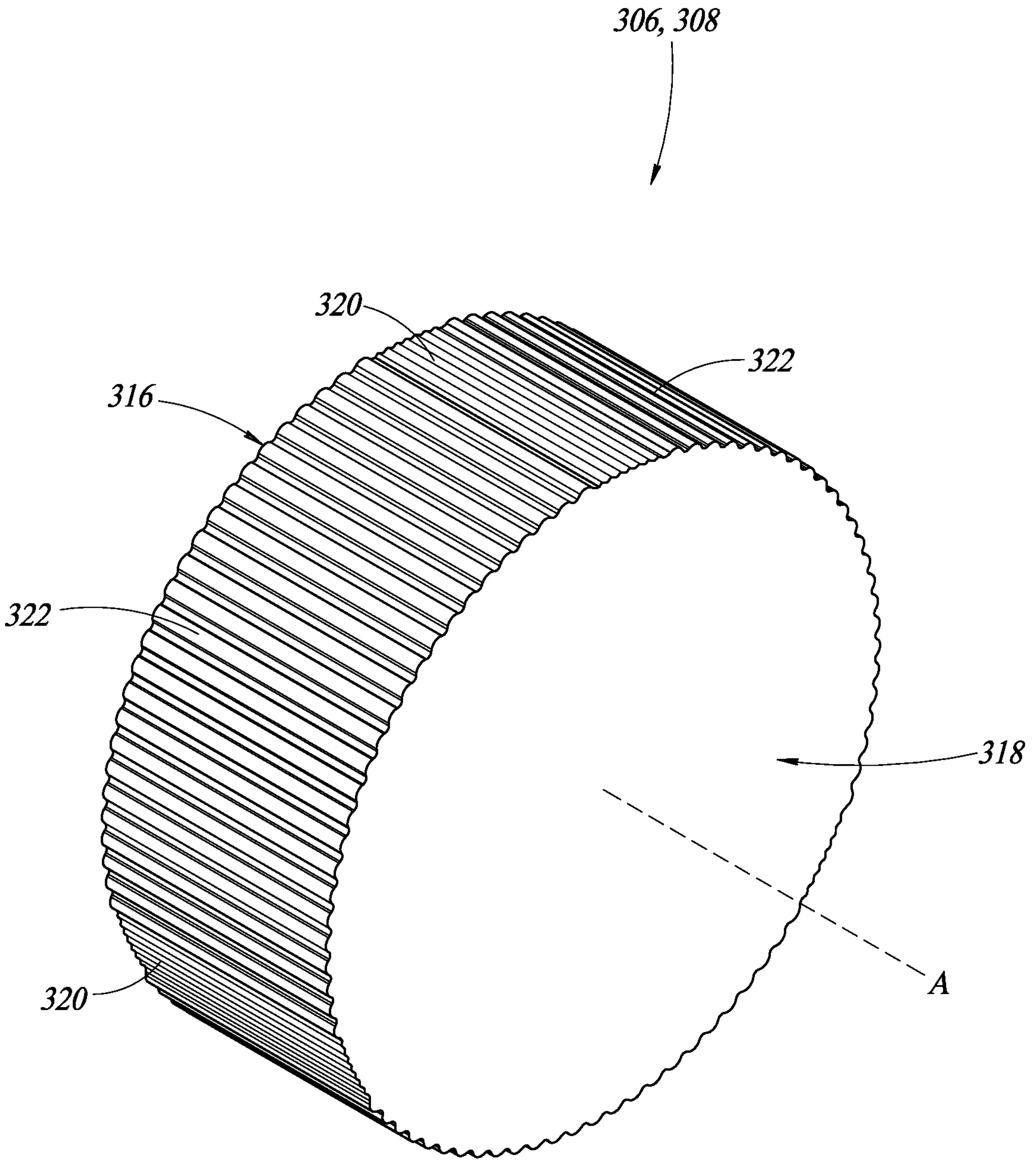
Figure 15:
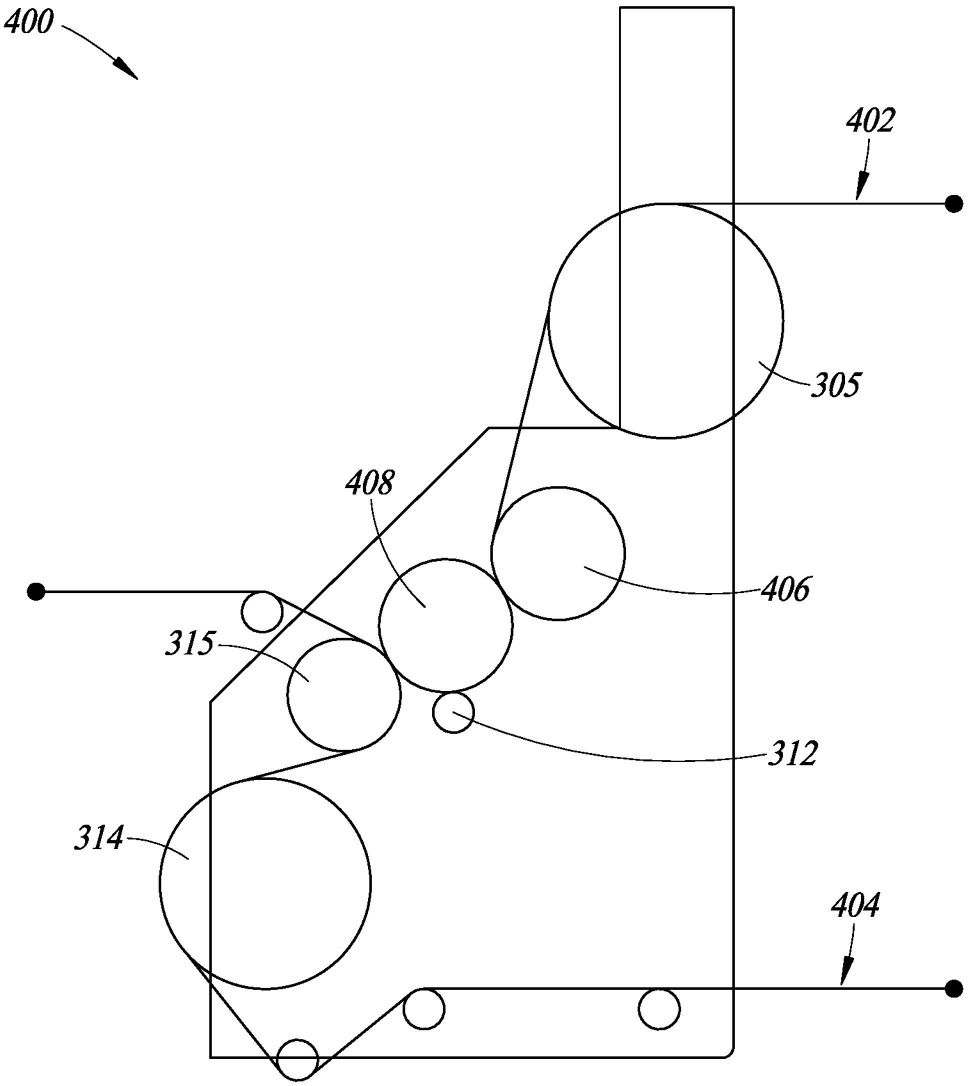
Figure 16A:
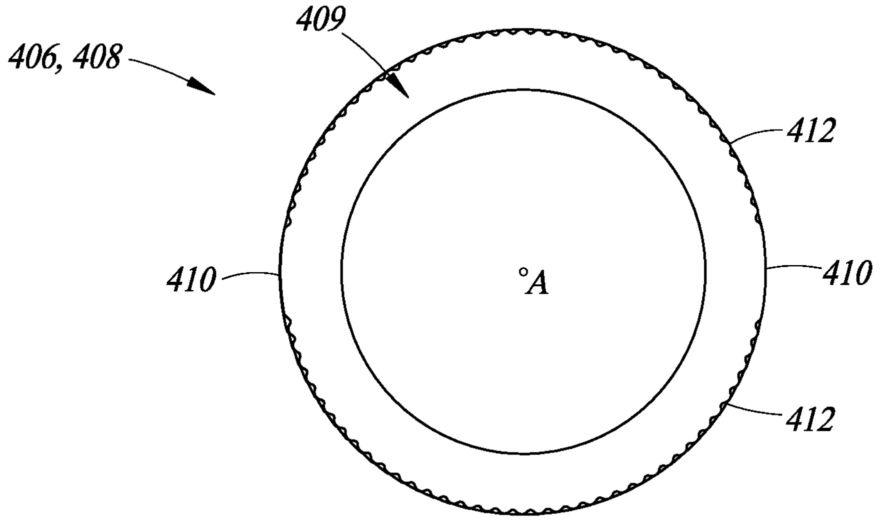
Figure 16B:
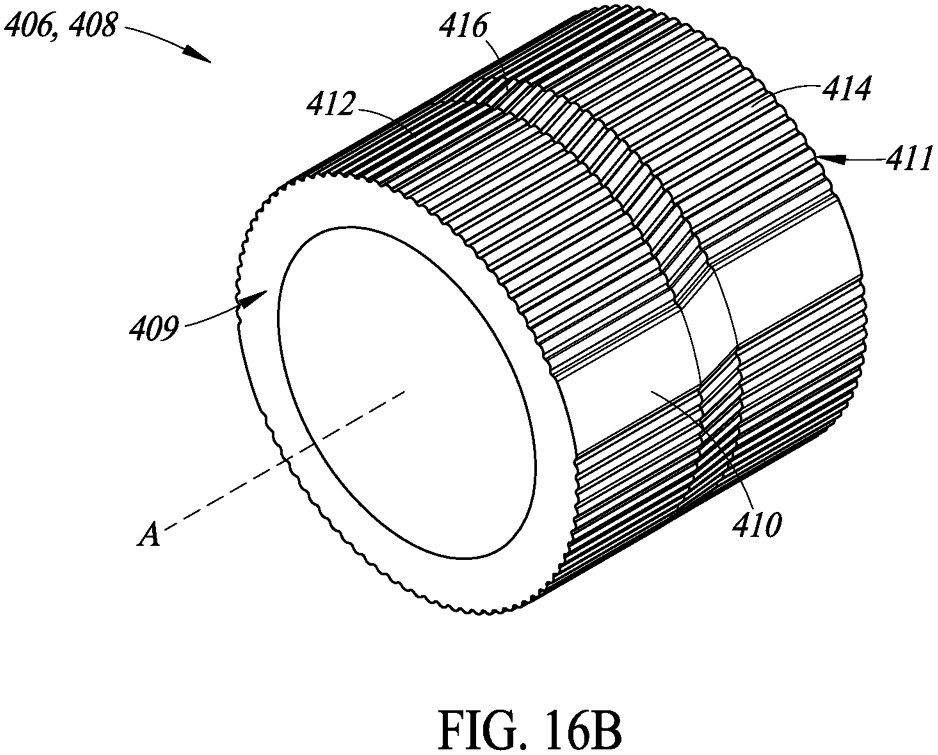
Figure 16C:
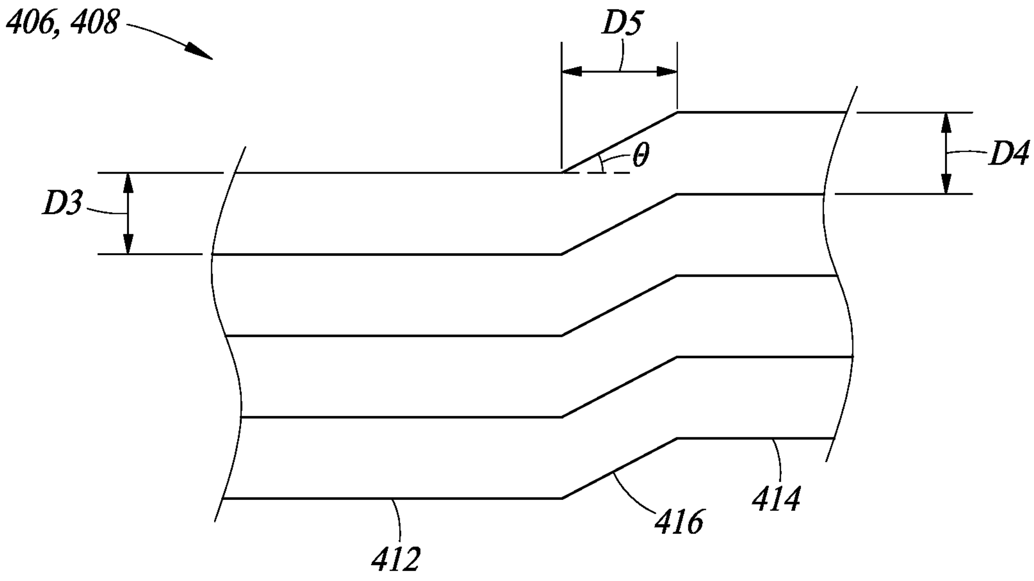
Figure 17:
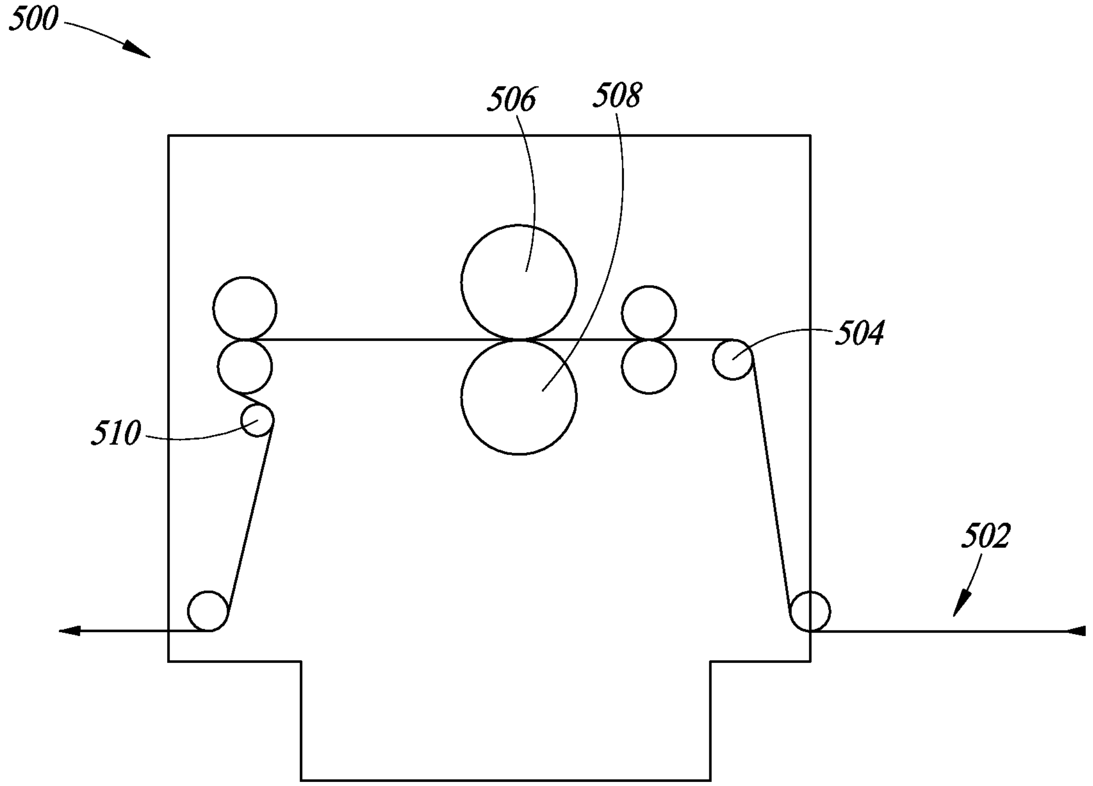
Figure 18:
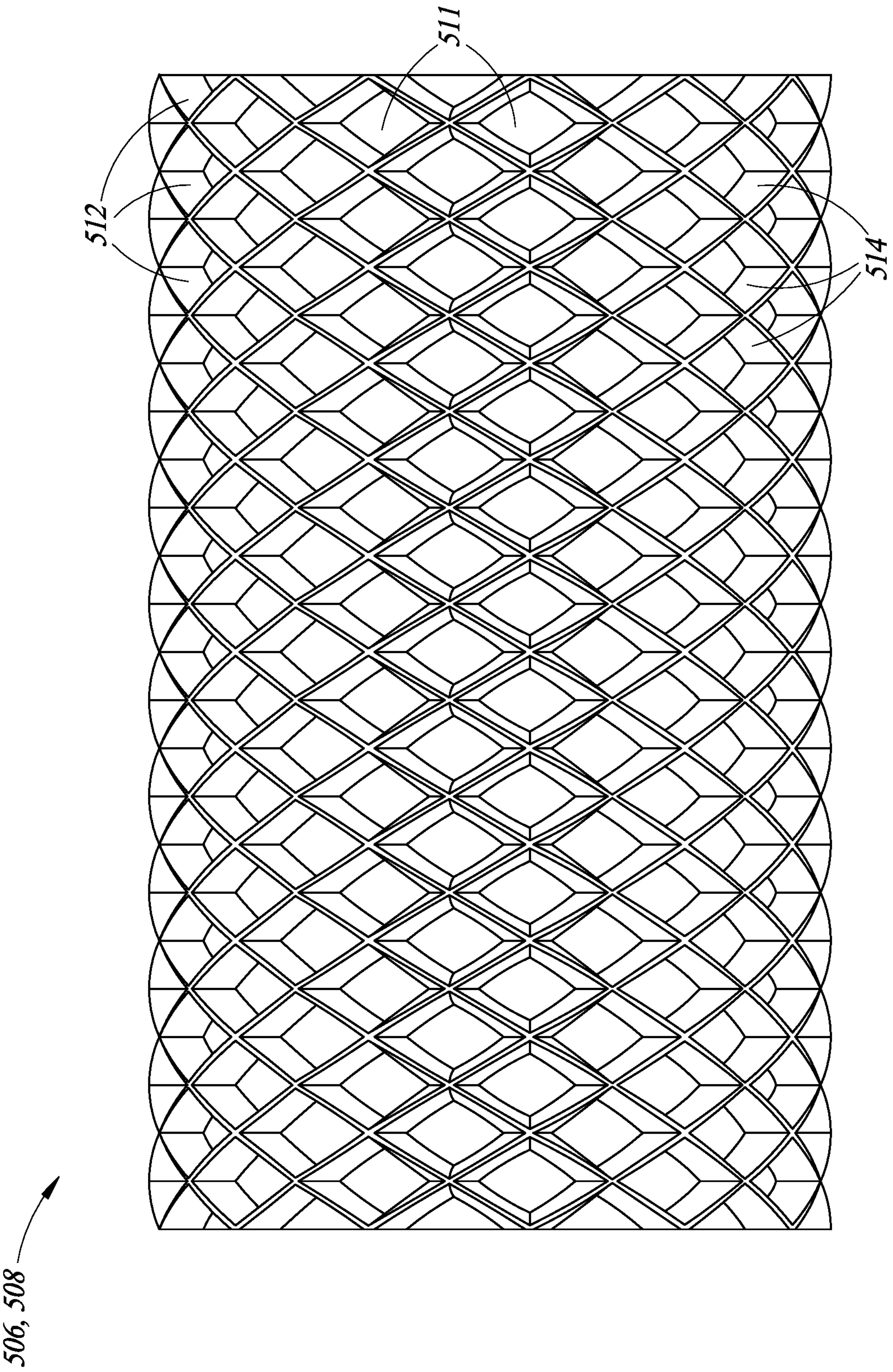
Figure 19:
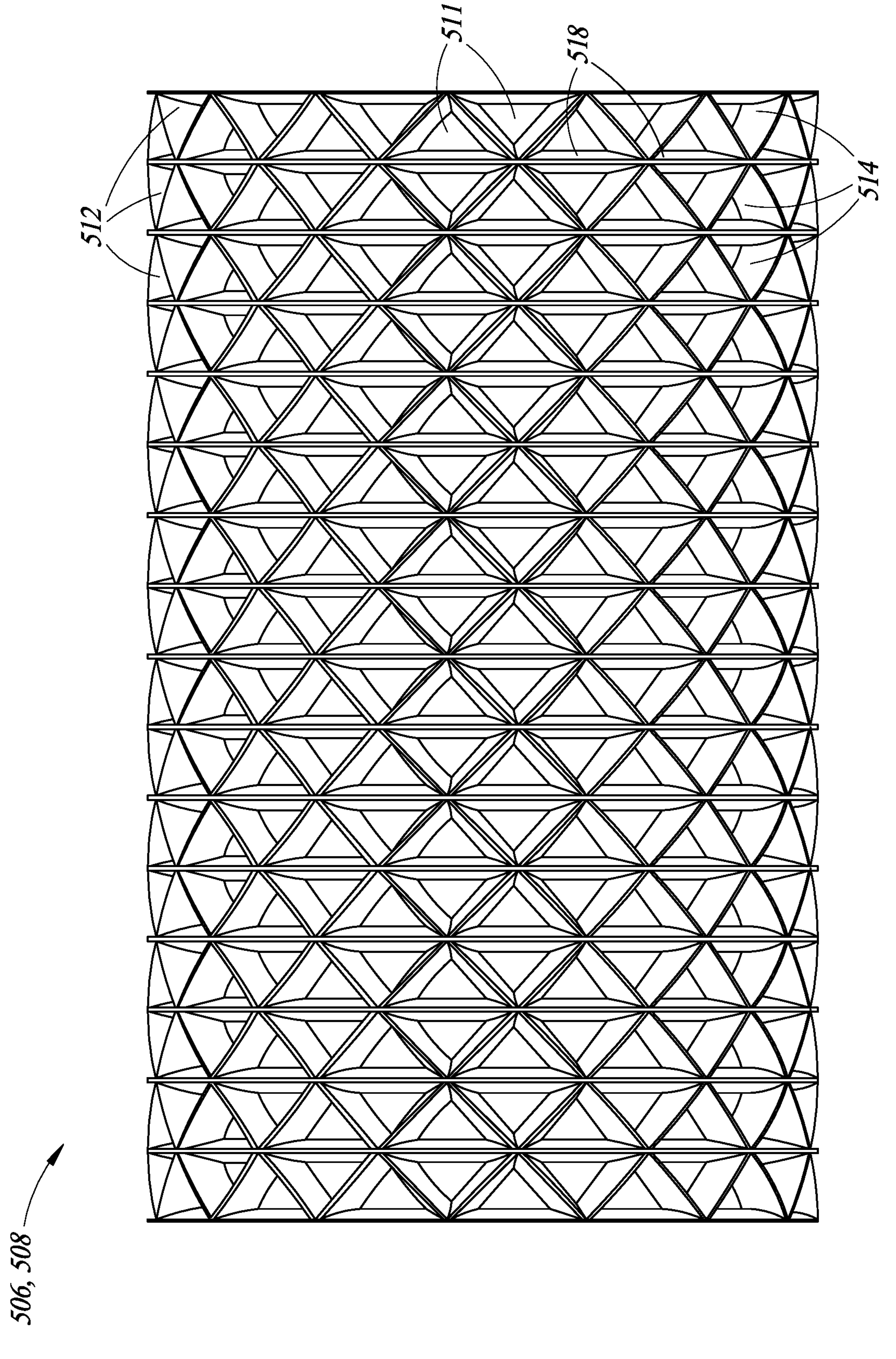

FIGS. 1A-1D are directed to an embodiment of a shipping container containing a product;

FIG. 1E is directed to the embodiment of the shipping container as shown within FIGS. 1A-1D without the product being present;

FIG. 2 is directed to an embodiment of a blank for forming an alternative embodiment of a shipping container;

FIG. 3 is directed to alternative embodiments of blanks for forming an alternative embodiment of a shipping container;

FIGS. 4A-4D are directed to an alternative embodiment of a blank for forming an alternative embodiment of a shipping container;

FIGS. 5A-5C are directed to an alternative embodiment of a blank for forming an alternative embodiment of a shipping container;

FIG. 6 is directed to an alternative embodiment of a blank for forming an alternative embodiment of a shipping container;

FIG. 7 is directed to an alternative embodiment of a blank for forming an alternative embodiment of a shipping container;

FIG. 8 is directed to an alternative embodiment of a blank for forming an alternative embodiment of a shipping container;

FIGS. 9A-9D are directed to embodiments of patterns for a plurality of score lines that may be present in embodiments of shipping containers of the present disclosure;

FIGS. 10A-10C are directed to embodiments of profiles of the embodiments of the plurality of score lines as shown in FIGS. 9A-9D;

FIGS. 11A-11D are directed to embodiments partial side sectional views of lateral side edges of embodiments of shipping containers of the present disclosure;

FIG. 12A is directed to an alternative embodiment of a blank for forming an alternative embodiment of a shipping container;

FIG. 12B is directed to a lateral side edge of the alternative embodiment of the shipping container formed from the alternative embodiment of the blank as shown in FIG. 12A;

FIG. 13 is directed to an embodiment of a corrugation machine for forming corrugated mediums for embodiments of shipping containers of the present disclosure;

FIGS. 14A and 14B are directed to an embodiment of a corrugation roller for forming corrugated mediums for embodiments of shipping containers of the present disclosure;

FIG. 14C is directed to an alternative embodiment of a corrugation roller for forming corrugated mediums for embodiment of shipping container of the present disclosure;

FIG. 15 is directed to an alternative embodiment of a corrugation machine for forming corrugated mediums for embodiments of shipping containers of the present disclosure;

FIG. 16A-16C are directed to an alternative embodiment of a corrugation roller for forming corrugated mediums for embodiments of shipping containers of the present disclosure;

FIG. 17 is directed to a creaser, scoring, or crusher machine for creasing, scoring, or crushing portions of corrugated mediums for embodiments of shipping containers of the present disclosure;

FIG. 18 is directed to an embodiment of a scoring roller for forming scores in corrugated mediums for embodiments of shipping containers of the present disclosure; and FIG. 19 is directed to an alternative embodiment of a scoring roller for forming scores in corrugated mediums for embodiments of shipping containers of the present disclosure.

DETAILED DESCRIPTION

In the following description, certain specific details are set forth in order to provide a thorough understanding of various embodiments of the disclosure. However, one skilled in the art will understand that the disclosure may be practiced without these specific details. In other instances, well-known structures and components associated with shipping containers or forming shipping containers have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

The use of ordinals such as first, second, third, fourth, etc., does not necessarily imply a ranked sense of order, but rather may only distinguish between multiple instances of an act or structure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms "top," "bottom," "upper," "lower," "vertical," "horizontal," "left," and "right," are used for only discussion purposes based on the orientation of the components in the discussion of the Figures in the present disclosure as follows. These terms are not limiting as to the possible positions explicitly disclosed, implicitly disclosed, or inherently disclosed in the present disclosure.

The term "substantially" is used to clarify that there may be slight differences or variations as for when a surface is coplanar with another surface in the real world, as nothing can be made perfectly equal or perfectly the same. In other words, substantially means that there may be some slight variation in actual practice, and instead, is made within accepted tolerances.

As used in this specification and the appended claims, the singular forms "a," "an," and "the" include plural referents unless the content clearly dictates otherwise.

The present disclosure is directed to embodiments of shipping containers (e.g., mailers, fluted mailers, flat envelopes, fluted envelopes, etc.). For example, in at least one embodiment, a recyclable, conformable shipping container includes an outer liner, a first corrugated medium adhered to the outer liner, and a second corrugated medium adhered to the outer liner. The first and second corrugated mediums are spaced apart from each other such that folding the outer liner forms the shipping container as well as forms an interior pocket of the shipping container. The interior pocket of the shipping container is lined with the corrugated mediums such that when a product is positioned or placed within the interior pocket, which is lined with first and second flutes, the first and second corrugated mediums, respectively, cushion, support, and protect the product. The first and second flutes cushion, support, and protect the product within the interior pocket when shipping the product to a consumer, a customer, or a buyer.

In one embodiment, when the shipping container is formed by folding the outer liner such that the first corrugated medium and the second corrugated medium face each other, the first flutes of the first corrugated medium and the second flutes of the second corrugated medium are offset relative to each other such that the first flutes nest within the second flutes and vice versa. For example, the first flutes include first peaks and first valleys, and the second flutes include second peaks and second valleys. The first peaks of the first flutes are received by ones of the second valleys of the second flutes, and the second peaks of the second flutes are received by ones of the first valleys of the first flutes due to this offset of the first flutes relative to the second flutes. This offset configuration of the first and second flutes of the first and second corrugated mediums, respectively, allows the shipping container to exhibit a reduction in overall thickness when compressed flat.

In some embodiments, the first and second corrugated mediums may be integral with each other such that the first and second corrugated mediums are made of a single, continuous material (e.g., paper, plastic, or some other suitable recyclable material).

The present disclosure is directed to embodiments of corrugating machines that are utilized to form corrugated mediums of embodiments of the shipping container of the present disclosure. The present disclosure is directed to corrugating rollers and scoring rollers that may be utilized in the embodiments of the corrugating machines to form the corrugated mediums of the embodiments of shipping containers within the present disclosure.

FIGS. 1A-1E are directed to an embodiment of a shipping container 10*a* in which a product 12 is positioned within an interior pocket 14 of the shipping container 10*a*. An opening 15 of the shipping container 10*a* provides access to the interior pocket 14 of the shipping container 10*a*. In other words, the opening 15 provides a user access to place the product 12 within the interior pocket 14 of the shipping container 10*a*.

The interior pocket 14 is positioned between a first panel 16 of the shipping container 10*a* and a second panel 18 of the shipping container 10*a*. The first panel 16 is opposite to the second panel 18. The first panel 16 includes a first corrugated medium 20 and a first portion 24*a* of an outer liner 24 to which the first corrugated medium 20 is adhered. The second panel 18 includes a second corrugated medium 22 and a second portion 24*b* of the outer liner 24 to which the second corrugated medium 22 is adhered. The first and second corrugated mediums 20, 22 may be adhered to the outer liner 24 by an adhesive, which may be a contact adhesive, a heat activated adhesive, or some other suitable type of adhesive for adhering the first and second corrugated mediums 20, 22 to the outer liner 24. The first corrugated medium 20, the second corrugated medium 22, the first portion 24*a* of the outer liner 24, and the second portion 24*b* of the outer liner 24 may be more readily and clearly seen in FIG. 1E. The corrugated mediums and the liner are formed from paperboard or linerboard.

In some embodiments, the first and second corrugated mediums 20, 22 are integral with each other and are made of a single, continuous material such that the first and second corrugated mediums 20, 22 are integrally coupled to each other. In some embodiments, the first and second corrugated mediums 20, 22 may be separate and distinct from each other.

In some embodiments, the first and second portions 24*a*, 24*b* of the outer liner 24 may be separate and distinct portions from each other. In some embodiments, the first and second portions 24*a*, 24*b* of the outer liner 24 are integral with each other and are made of a single, continuous material such that the first and second portions 24*a*, 24*b* are integrally coupled to each other.

The first corrugated medium 20 includes a plurality of first flutes 26 and the second corrugated medium 22 includes a plurality of second flutes 28. The plurality of first flutes 26 and the plurality of second flutes 28 are substantially the same size and shape as each other. In some embodiments, the plurality of first flutes 26 and the plurality of second flutes 28 may be different sizes and shapes (e.g., different heights, different widths, different lengths, etc.). Flutes of different widths are characterized by different distances between adjacent peaks or adjacent valleys of the corrugated medium. Flutes of different heights are characterized by different distances between a bottom of a valley and the top of a peak. The first and second flutes 26, 28 of the first and second corrugated mediums 20, 22 line the interior pocket 14 of the shipping container 10*a*. The first and second flutes 26, 28 of the first and second corrugated mediums 20, 22, respectively, cushion, support, and protect the product 12 within the interior pocket 14 when shipping the product to a consumer, a customer, or a buyer.

Respective adjacent peaks of the first and second flutes 26, 28 may be spaced apart by a distance ranging substantially from 0.25-inches to 2-inches. For example, a first peak of one of the first flutes 26 is spaced apart from a second peak of another of the first flutes 26 adjacent to the first peak by a first distance ranging from substantially 0.25-inches to 2-inches, and a third peak of one of the second flutes 28 is spaced apart from a fourth peak of another of the second flutes 28 adjacent to the third peak by a second distance ranging from substantially 0.25-inches to 2-inches.

In some embodiments, the first distance may be equal to the second distance. In some embodiments the first distance may be different from the second distance.

The first corrugated medium 20 includes a plurality of first score lines 30, which are slits cut into the first flutes 26 or indentations or creases that are on the first flutes 26 of the first corrugated medium 20. When the plurality of first score lines 30 are slits, they extend through all or a portion of the first flutes 26 of the first corrugated medium 20. When the plurality of first score lines 30 are indentations or creases, they are formed through the entire height or a portion of the entire height of the first flutes 26. The plurality of first score lines 30 may be diagonal aligned, vertically aligned, horizontally aligned, or some other combination of directional alignment based on the orientation of the shipping container as shown in FIG. 1B. For example, the first score lines 30 may include a first group of the first score lines 30 that extend in a first direction and a second group of the first score lines 30 that extend in a second direction, which is transverse to the first direction. The first group of first score lines 30 may overlap with the second group of the first score lines 30 forming geometric shapes between the score lines 30 on the first flutes 26 of the first corrugated medium 20. The geometric shapes on the first flutes 26 are diamond shapes, which can be more readily seen in FIG. 1C. Embodiments in accordance with the present disclosure are not limited to geometric shapes that are diamond shaped. In other embodiments, the geometric shapes are different than diamond shaped.

The second corrugated medium includes a plurality of second score lines 32, which are slits cut into the second flutes 28 or indentations or creases that are on the second flutes 28 of the second corrugated medium 22. When the plurality of second score lines 32 are slits, they extend through all or a portion of the second flutes 28 of the second corrugated medium 22. When the plurality of second score lines 32 are indentations or creases, they are formed through the entire height or a portion of the entire height of the second flutes 28. The plurality of second score lines 32 may be diagonally aligned, vertically aligned, horizontally aligned, or some other combination of directional alignment based on the orientation of the package as shown in FIG. 1B. For example, the second score lines 32 may include a first group of the second score lines 32 that extend in a first direction and a second group of the second score lines 32 that extend in a second direction, which is transverse to the first direction. The first group of second score lines 32 may overlap with the second group of the second score lines 32 forming geometric shapes between the second score lines 32 on the second flutes 28 of the second corrugated medium 22. The geometric shapes on the second flutes 28 are diamond shapes, which can be more readily seen in FIG. 1C. Embodiments in accordance with the present disclosure are not limited to geometric shapes that are diamond shaped. In other embodiments, the geometric shapes are different than diamond shaped.

In some embodiments, the first and second score lines 30, 32 of the first and second corrugated mediums 20, 22, respectively, may be perforated score lines. In some embodiments, the first and second score lines 30, 32 of the first and second corrugated mediums 20, 22, respectively, may be non-perforated score lines. In some embodiments, the first and second score lines 30, 32 may be dotted score lines. In some embodiments, the first and second score lines 30, 32 may be continuous score lines.

The first and second score lines 30, 32 of the first and second corrugated mediums 20, 22, respectively, provide the first and second flutes 26, 28 of the first and second corrugated mediums 20, 22, respectively, with conformability, e.g., flexibility, such that the first and second flutes flex, fold, compress and/or expand to conform to the product 12 when placed within the interior pocket 14 of the shipping container 10*a*. For example, when the product 12 contacts ones of the first and second flutes 26, 28, the first and second flutes 26, 28 may flex, fold, compress and/or expand in reaction to the product contacting the first and second flutes 26, 28 resulting in the first and second flutes 26, 28 more readily conforming to the shape of the product 12. In other words, the shipping container 10*a* conforms to the product 12 or differently shaped and sized products accordingly.

Respective adjacent scores lines of the first and second score lines 30, 32 may be spaced apart by a distance ranging substantially from 0.25-inches to 2-inches. For example, one of the first score lines 30 is spaced apart from another of the first score lines 30 adjacent to the one of the first score lines 30 by a first distance ranging from substantially 0.25-inches to 2-inches, and one of the second score line 32 is spaced apart from another of the second score lines 32 s adjacent to the one of the second score lines 32 by a second distance ranging from substantially 0.25-inches to 2-inches.

In some embodiments, the first distance may be equal to the second distance. In some embodiments the first distance may be different from the second distance.

A flap 34 of the outer liner 24 extends outward from the first portion 24*a* of the outer liner 24. The flap 34 is configured to cover the opening 15 closing off the interior pocket 14 when shipping the product 12 within the shipping container 10*a*. The flap 34 is integral the first portion 24*a* of the outer liner 24 such that the flap is made of a single, continuous material with the first portion 24*a* of the outer liner 24.

In some embodiments, the flap 34 may be a separate and distinct portion of the shipping container 10*a* that is adhered or coupled to the first portion 24*a* of the outer liner 24 by an adhesive or by some other suitable coupling or adhesion technique.

As shown in FIG. 1C, an adhesive 36 is on the flap 34. The adhesive 36 may be a contact adhesive, a heat activated adhesive, or some other type of adhesive. The adhesive 36 is covered by a release liner 38. The adhesive 36 temporarily or removably couples the release liner 38 to the flap 34. When folding the flap 34 to cover the opening 15 closing off the interior pocket 14, a user pulls the release liner 38 off the adhesive 36, which exposes the adhesive 36. The flap 34 is then folded to contact the second portion 24*b* of the outer liner 24 such that the adhesive 36 adheres the flap 34 to the second portion 24*b* of the outer liner 24 closing off and covering the interior pocket 14 of the shipping container 10*a* to protect, cushion, and support the product 12 within the shipping container 10*a* when shipped to a customer, a consumer, or a buyer.

As shown in FIG. 1C, the first panel 16 includes a first lateral seal edge 40 at the left-hand side of FIG. 1C and a second lateral seal edge 42 at the second right-hand side of FIG. 1C. The second panel 18 includes a third lateral seal edge 44 at the left-hand side of FIG. 1C and a fourth lateral seal edge 46 at the right-hand side of FIG. 1C. The first and second lateral seal edges 40, 42 may be edges of the first portion 24*a* of the outer liner 24, and the third and fourth lateral seal edges 44, 46 may be edges of the second portion 24*b* of the outer liner 24. The first lateral seal edge 40 is adhered to the third lateral seal edge 44 by an adhesive, and the second lateral seal edge 42 is adhered to the fourth lateral seal edge 46 by an adhesive.

A fifth edge 48 is transverse to the first, second, third, and fourth lateral seal edges 40, 42, 44, 46 of the first and second panels 16, 18, respectively. The fifth edge 48 may be a fold line edge that separates the first portion 24*a* of the outer liner 24 from the second portion 24*b* of the outer liner 24. The fold line edge 48 may be a crease line, a scored line, or some other type of fold line to assist in folding the outer liner 24 about the fold line edge 48. The fold line edge 48 is an edge upon which the outer liner 24 is folded to align the first, second, third, and fourth lateral seal edges 40, 42, 44, 46 such that the first, second, third, and fourth lateral seal edges 40, 42, 44, 46 may be adhered together to form the shipping container 10*a*. For example, when the outer liner 24 is folded about the fifth edge 48, the first lateral seal edge 40 becomes aligned with and overlaps the third lateral seal edge 44 such that the first and third lateral seal edges 40, 44 may be adhered to each other. When the outer liner 24 is folded about the fifth edge 48, the second lateral seal edge 42 becomes aligned with and overlaps the fourth lateral seal edge 46 such that the second and fourth lateral seal edges 42, 46 may be adhered to each other.

FIG. 1D is a cross-sectional view taken about line 6-6 in FIG. 1C in which the product 12 is not present within the interior pocket 14 of the shipping container 10*a*.

FIG. 1E is a cross-sectional zoomed in view of the first panel 16 and the second panel 18 when the shipping container 10*a* is in a compressed and flattened state to be shipped to a retailer in which the shipping container 10*a* will be later used by the retailer to ship a product.

As shown in FIG. 1E, the first flutes 26 each include a first peak 50 and a first valley 52. The distance between adjacent peaks 50 is a first distance D1. The first peaks 50 are spaced apart from each other by ones of the first valleys 52. The distance between adjacent valleys 52 is a second distance D2. The first valleys 52 are spaced apart from each other by ones of the first peaks 50. The second flutes 28 each include a second peak 54 and a second valley 56. The second peaks 54 are spaced apart from each other by ones of the second valleys 56, and the second valleys 56 are spaced apart from each other by ones of the second peaks 54. As shown in FIG. 1E, the first distance D1 is substantially equal to the distance D2 as the first flutes 26 are relatively the same size as the second flutes 28.

In some embodiments, the first flutes 26 may be differently shaped or sized than the second flutes 28 such that the first distance D1 is less than the second distance D2. In some embodiments, the first flutes 26 may be differently shaped or sized than the second flutes 28 such that the first distance D1 is greater than the second distance D2.

FIG. 2 is an embodiment of a blank 58*a* to form an embodiment of a shipping container, which is not shown for simplicity and brevity sake of the present disclosure. While the shipping container formed by the blank 58*a* is not shown, a structure of the shipping container formed by the blank 58*a* will be readily apparent in view of the discussions within the present disclosure.

The blank 58*a* has features that are the same or similar as features of the shipping container 10*a* as shown in FIGS. 1A-1E. Accordingly, for the sake of simplicity and brevity of the present disclosure, only differences and additional features of the blank 58A with respect to the shipping container 10*a* as shown in FIGS. 1A-1E will be discussed in further detail herein.

The blank 58*a* includes a first panel 60 and a second panel 62, which are similar to the first panel 16 and the second panel 18 as discussed with respect to FIGS. 1A-1E. The blank 58*a* includes a midline axis 64 that is at a half-way point of a support medium 66 of the blank 58*a* that separates the support medium 66 into two substantially equal halves.

The first panel 60 and the second panel 62 both include an outer liner 65 and a support medium 66 that is adhered to a surface of the outer liner 65. The support medium 66 includes a plurality of score lines 63, which are the same or similar as the plurality of scores lines 30, 32 as discussed with respect to FIGS. 1A-1E. While the support medium 66 is shown in FIG. 2 without flutes, in some embodiments, the support medium 66 may include flutes similar to the first and second flutes 26, 28 as discussed with respect to FIGS. 1A-1E.

The support medium 66 includes a plurality of crushed regions 67*a*, 67*b*, 67*c*. A first crushed region 67*a* is directly adjacent to an end of the support medium 66 closet to the left-hand side of FIG. 2, a second crushed region 67*b* is positioned between the first panel 60 and the second panel 62 at a location at which the first panel 60 meets the second panel 62, and a third crushed region 67*c* is at an end of the support medium closet to the right-hand side of FIG. 2. The crushed regions 67*a*, 67*b*, 67*c* reduce a thickness of a shipping container at these corresponding locations of the crushed regions 67*a*, 67*b*, 67*c* when the blank 58*a* is folded and utilized to form the shipping container. This reduced thickness of these crushed regions 67*a*, 67*b*, 67*c* as compared to thicknesses at other locations of the support medium 66 allows the blank 58*a* to be more readily and easily folded at these locations to form the shipping container from the blank 58*a*.

In some embodiments, the support medium 66 may be a corrugated medium. In some embodiments, the support medium 66 is a single, continuous piece of material and the outer liner 65 is a single, continuous piece of material. In some embodiments, the support medium 66 may be at least two separate and distinct corrugated mediums. In some embodiments, the support medium 66 may be a single, continuous corrugated medium with a first corrugated portion at the first panel 60 and a second corrugated portion at the second panel 62, and the first corrugated portion and the second corrugated portion are integrally coupled to each other.

A fold line 68 is positioned between the first panel 60 and the second panel 62. The fold line 68 is the same or similar as the fold line edge 48 as discussed with respect to FIGS. 1A-1E. The fold line 68 is adjacent to the midline axis 64.

A flap 70 is at an end of the outer liner 65 furthest away from the second panel 62. The flap 70 is the same or similar as the flap 34 as discussed with respect to FIGS. 1A-1E. However, unlike the flap 48 as discussed with respect to FIGS. 1A-1E, the flap 70 includes a fold line 72 about which the flap 70 is folded along for adhering an adhesive on the flap 70 to a portion of the outer liner 65 that makes up the second panel 62. When the flap is folded and adhered to the portion of the outer liner 65, the flap 70 closes off an interior pocket of the shipping container formed by the blank 58*a*. The fold line 72 allows a user to more readily adhere the flap 70 to the portion of the outer liner 65 that makes up the second panel 62 reducing the likelihood of poor adhesion between the flap 70 and the portion of the outer liner 65 that makes up the second panel 62.

The blank 58*a* includes lateral seal edges 74, 76, 78, 80, which are the same or similar as the lateral seal edges 40, 42, 44, 46 as discussed with respect to FIGS. 1A-1E. When the blank 58*a* is folded about the fold line 68, the first lateral seal edge 74, which is at the upper right-hand corner of FIG. 2, of the first panel 60 is adhered to a second lateral seal edge 76, which is at the upper left-hand corner of FIG. 2, of the second panel 62. When the blank 58*a* is folded about the fold line 68, a third lateral seal edge 78, which is at the lower left-hand corner of FIG. 2, of the first panel 60 is adhered to a fourth lateral seal edge 80, which is at the lower right-hand corner of FIG. 2, of the second panel 62. The lateral seal edges 74, 76, 78, 80 may be correspondingly adhered to each other by an adhesive in the same or similar manner as the lateral seal edges 40, 42, 44, 46 as discussed with respect to FIGS. 1A-1E.

FIG. 3 is directed to an alternative embodiment of a blank 58*b* that is utilized to form an alternative embodiment of a shipping container, which is not shown for simplicity and brevity of the present disclosure herein.

The blank 58*b* includes a first blank portion 82*a*, which is at the left-hand side of FIG. 3, and a second blank portion 82*b*, which is at the right-hand side of FIG. 3. The first blank portion 82*a* is larger than the second blank portion 82*b*.

The first blank portion 82*a* includes a first corrugated medium 84 adhered to a first outer liner 86. The first corrugated medium 84 is the same or similar as the first corrugated medium 20 as discussed with respect to FIGS. 1A-1E. However, unlike the first corrugated medium 20 as discussed with respect to FIGS. 1A-1E, a plurality of score lines 88 of the first corrugated medium 84 form larger diamond shape patterns on flutes 90 of the first corrugated medium 84. These diamond shape patterns on the flutes 90 are larger relative to those of the first corrugated medium 20 as shown in FIGS. 1A-1E. Each of the flutes 90 includes a corresponding longitudinal axis extending in the same direction as a line 95.

The first blank portion 82*a* includes a flap 91 of the outer liner 86 that extends away from the first corrugated medium 84. The flap 91 is the same or similar to the flap 34 as discussed with respect to FIG. 1A. Similar to the flap 34, the flap 91 includes a release liner 93 temporarily, removably, and releasably coupled to an adhesive on the flap 91. The release liner 93 is the same or similar as the release liner 38 as discussed with respect to FIGS. 1A-1E. The flap 91 is at the top-side of the first blank portion 82*a* based on the orientation of the first blank portion 82*a* in FIG. 3.

The first blank portion 82*a* includes lateral seal edges 92, 94, 96 that are the same or similar as the lateral seal edges 40, 42, 44, 46 as discussed with respect to FIGS. 1A-1E. A first lateral seal edge 92 and a second lateral seal edge 94 are transverse to a third lateral seal edge 96. The first lateral seal edge 92 is on the left-hand side of the first blank portion 82*a* and the second lateral seal edge 94 is on the right-hand side of the first blank portion based on the orientation of the first blank portion 82*a* as shown in FIG. 3. The third lateral seal edge 96 is at the bottom-side of the first blank portion 82*a* based on the orientation in FIG. 3. The first and second lateral seal edges 92, 94, respectively, extend from the third lateral seal edge 96 to the flap 91.

The second blank portion 82*b* includes a second corrugated medium 98 on a second outer liner 100. The second corrugated medium 98 is the same or similar as the second corrugated medium 22 as discussed with respect to FIGS. 1A-1E. However, unlike the second corrugated medium 22 as discussed with respect to FIGS. 1A-1E, a plurality of score lines 102 of the second corrugated medium 98 form diamond shape patterns on flutes 104 that are larger than those of the second corrugated medium 22 as discussed with respect to and shown in FIGS. 1A-1E. Each one of the flutes 104 includes a corresponding longitudinal axis that extends in the same direction as a line 106.

The longitudinal axes 106 at a peak of the flutes 104 of the second corrugated medium 98 of the second blank portion 82*b* are offset with respect to the longitudinal axes 95 of the flutes 90 of the first corrugated medium 84 of the first blank portion 82*a*. This offset between the longitudinal axes 95, 106 results in the flutes 90 of the first corrugated medium 84 of the first blank portion 82*a* nesting within the flutes 104 of the second corrugated medium 98 of the second blank portion 82*b* when forming the shipping container with the first and second blank portions 82*a*, 82*b*, respectively. This offset alignment can be more readily appreciated in view of FIG. 1E.

The second blank 82*b* includes lateral seal edges 108, 110, 112 that are the same or similar as the lateral seal edges 40, 42, 44, 46 as discussed with respect to FIGS. 1A-1E. A first lateral seal edge 108 and a second lateral seal edge 110 are transverse to a third lateral seal edge 112. The first lateral seal edge 108 is on the left-hand side of the second blank portion 82*b* and the second lateral seal edge 110 is on the right-hand side of the second blank portion 82*b* based on the orientation in FIG. 3. The third lateral seal edge 112 is at the bottom-side of the second blank portion 82*b* based on the orientation in FIG. 3. The first and second lateral seal edges 108, 110 extend from third lateral seal edge 112 to an end of the second blank portion 82*b* opposite to the end at which the third lateral seal edge 112 is present.

When forming the shipping container utilizing the first blank portion 82*a* and the second blank portion 82*b*, the first lateral seal edge 92 of the first blank portion 82*a* is adhered to the second lateral seal edge 110 of the second blank portion 82*b*, the second lateral seal edge 94 of the first blank portion 82*a* is adhered to the first lateral seal edge 108 of the second blank portion 82*b*, and the third lateral seal edge 96 of the first blank portion 82*a* is adhered to the third lateral seal edge 112 of the second blank portion 82*b*. After the lateral seal edges 92, 94, 96, 108, 110, 112 of the first and second blank portions 82*a*, 82*b*, respectively, are adhered together, the release liner 93 is pulled off to expose the adhesive on the flap 91, and the flap 91 is adhered to the outer liner 100 of the second blank portion 82*b*. These lateral sealed edges may be adhered together by an adhesive such as a glue.

FIGS. 4A-4D are directed to an alternative embodiment of a shipping container 10*b*, which is the same or similar to the shipping container 10*a* as shown in FIGS. 1A-1E. Similar to the product 12 in the shipping container 10*a* as shown in FIGS. 1A-1D, a product 114 is positioned within the shipping container 10*b* as shown in FIGS. 4A-4D.

Unlike the shipping container 10*a* as shown in FIGS. 1A-1E, the shipping container 10*b* has a side flap 116 that wraps around the right-hand side of the shipping container 10*b* and is adhered to the outer liner on the opposite side of the shipping container 10*b*. For example, the side flap 116 may be the same or similar as the flap 70 as shown in FIG. 2.

The shipping container 10*b* has a midline axis 118 that evenly splits the shipping container 10*b* into a first half on the right-hand side of the midline axis 118 and a second half on the left-hand side of the midline axis 118. The height and width of the first half is substantially equal to the height and width of the second half.

Figure 4A:
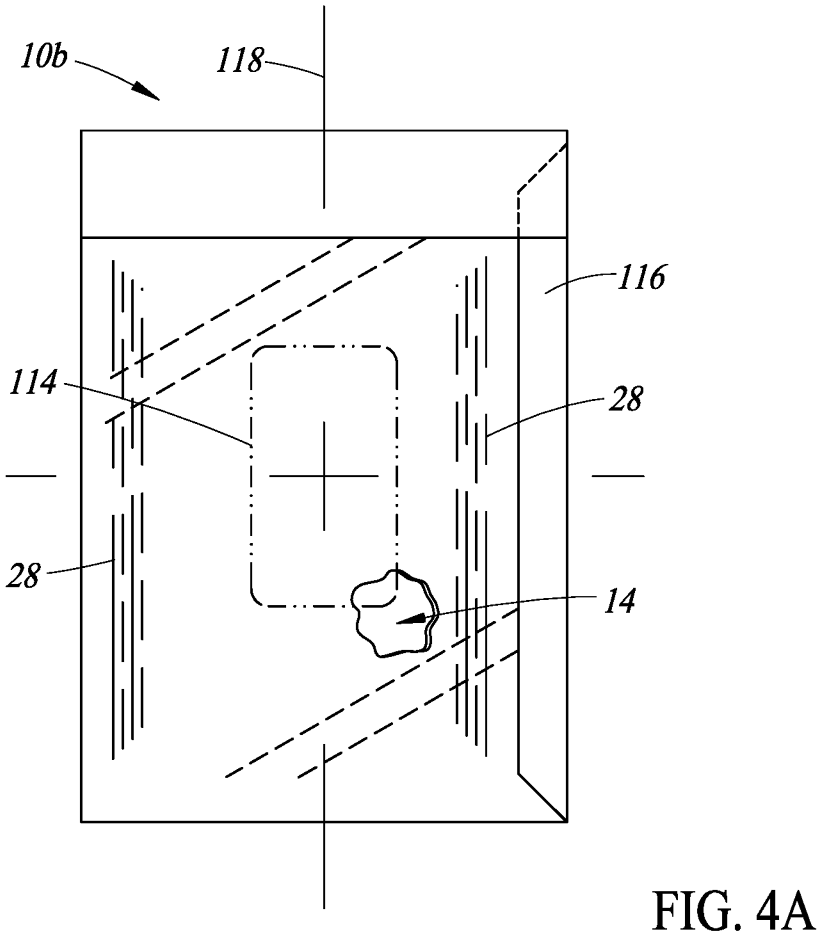
Figure 4B:
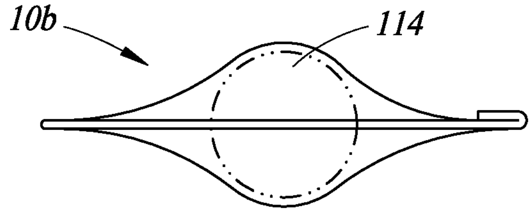
Figure 4C:
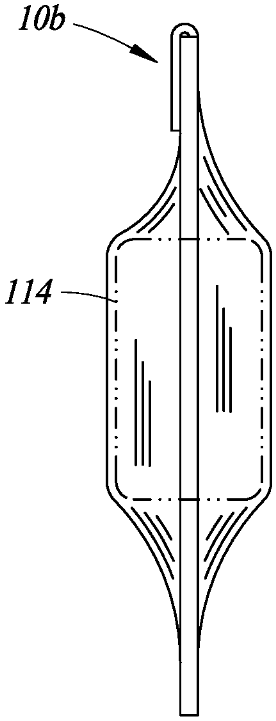
Figure 4D:
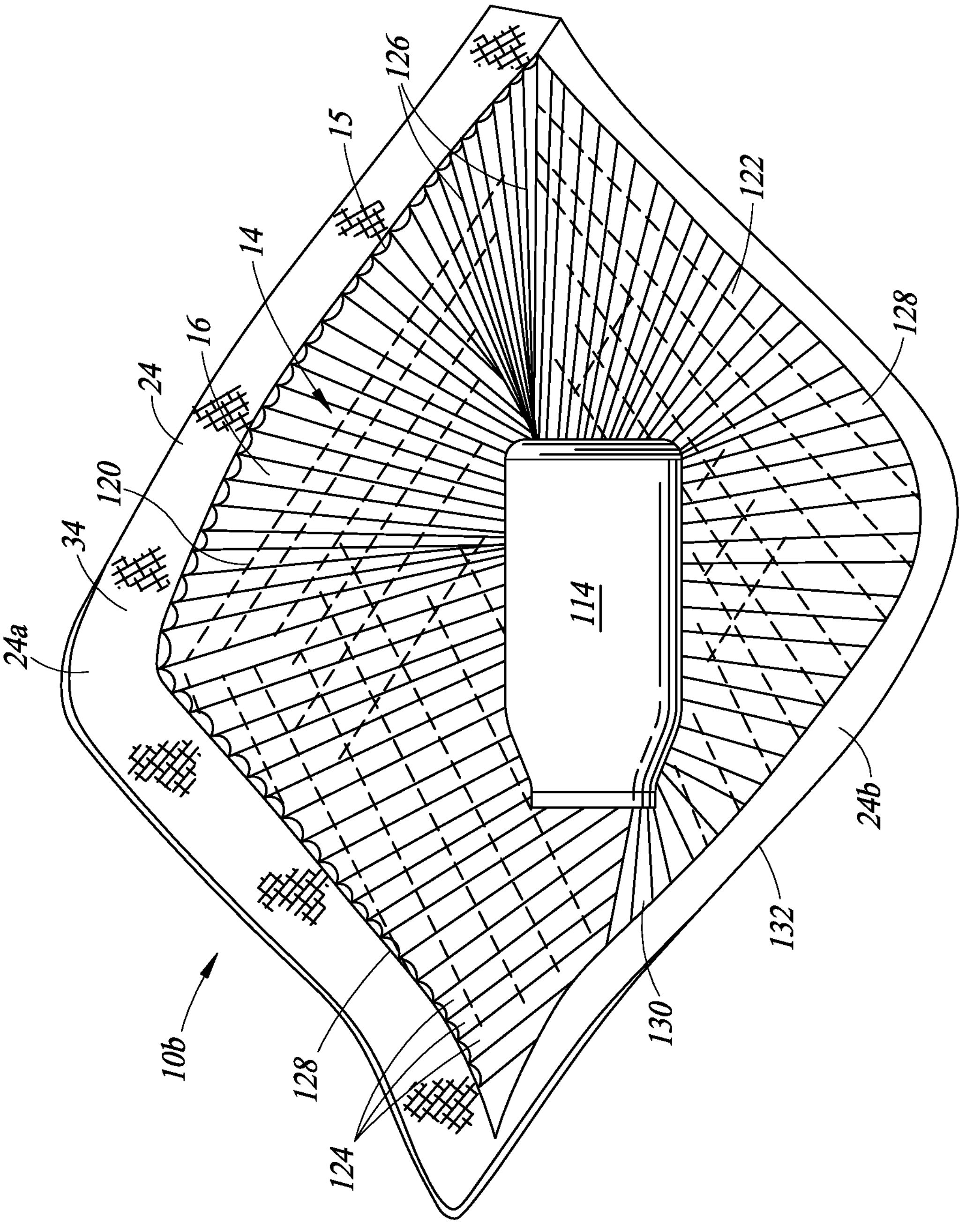

Unlike the first corrugated medium 20 of the shipping container 10*a*, a first corrugated medium 120 as shown in FIG. 4D of the shipping container 10*b* has a plurality of first flutes 124 having a first width and a plurality of second flutes 126 having a second width that is less than the first width. The widths of a flute are described above with reference to FIGS. 1A-1E and is not repeated here in the interest of brevity. Unlike the second corrugated medium 22 of the shipping container 10*b*, a second corrugated medium 122 as shown in FIG. 4D of the shipping container 10*b* has a plurality of third flutes 128 of a third width and a plurality of fourth flutes 130 having a fourth width less than the third width.

In some embodiments, the first width is substantially equal to the third width and the second width is substantially equal to the fourth width. In some embodiments, the first width may be different than the third width and the second width may be different from the fourth width. In some embodiments, the first width, the second width, the third width, and the fourth width may be different from each other, may be substantially equal to each other, or may be related to each other in some other combination or manner.

Unlike the shipping container 10*a* as shown in FIGS. 1A-1E, the shipping container 10*b* as shown in FIG. 4D has a support flap 132 that extends outward from the second portion 24*b* of the outer liner 24. The support flap 132 provides support for a top edge of the second panel 18 making access to the opening 15 more readily and easily accessible. The support flap 132 may reinforce the top edge of the shipping container 10*b* when the shipping container has been closed utilizing the flap 34 to reduce the likelihood of the shipping container 10*b* accidentally opening when the shipping container 10*b* is utilized to ship the product 114.

FIGS. 5A-5C are directed to a blank 58*c* that is similar as the blanks 58*a*, 58*b* as discussed earlier with respect to FIGS. 2 and 3.

As shown in FIG. 5A, the blank 58*c* includes a first panel 134 and a second panel 136. The first panel 134 is the same or similar as the first panel 16 of the shipping container 10*a*. The second panel 136 is the same or similar as the second panel 18 of the shipping container 10*a*.

The first panel 134 includes a first corrugated medium 138 and a first portion 140*a* in FIG. 5B of an outer liner 140. The second panel 136 includes a second corrugated medium 142 and a second portion 140*b* in FIG. 5B of the outer liner 140.

The first corrugated medium 138 includes first flutes 144 having a first width and second flutes 146 having a second width that is smaller than the first width. The first flutes 144 are relatively larger, e.g., wider or higher/taller, than the second flutes 146. The first flutes 144 are positioned between a first group of the second flutes 146, which are at the left-hand side of the first panel 134 as shown in FIG. 5A, and a second group of the second flutes 146, which are at the left-hand side of the first panel 134 as shown in FIG. 5A. The second group of the second flutes 146 are on and at a side edge extension 150 that extends outward from the first panel 134. The first and second flutes 144, 146 are the same or similar as the flutes 126, 128 of the shipping container 10*b* as discussed with respect to FIGS. 4A-4D.

The first corrugated medium 138 includes a plurality of scores lines 152 on the first flutes 144 and the second flutes 146 that extend in a direction directed from the right-hand side of the first panel 134 to the left-hand side of the first panel 134. The score lines 152 are at an angle with respect to the right-hand side and the left-hand side of the first panel 134 such that the scores lines 152 are diagonal score lines.

The score lines 152 are the same or similar as the first and second score lines 30, 32 as discussed with respect to FIGS. 1A-1E. However, unlike the scores lines 30, 32, the score lines 152 form diagonal score lines and do not form diamond shape patterns on the first corrugated medium 138.

The functionality of the score lines 152 in combination with the flutes 144, 146 will not be discussed in further detail herein as the functionality of the combination of the score lines 152 and the flutes 144, 146 is the same or similar as the functionality of the score lines 30, 32 and the flutes 26, 28 of the shipping container 10*a* as discussed earlier with respect to FIGS. 1A-1E.

Each of the first and second flutes 144, 146 includes a longitudinal axis 154, and the longitudinal axes 154 of the first and second flutes 144, 146 are substantially parallel with each other. The first flutes 144 include first ends 145 and the second flutes 146 include second ends 147. Ones of the first end 145 and ones of the second ends 147 of the first and second flutes 144, 146, respectively, are adjacent to a flap 156 of the outer liner 140.

The flap 156 of the outer liner 140 extends outward and away from the first corrugated medium 138. The flap 156 of the blank 58*c* is the same or similar to the flap 34 of the shipping container 10*a* as discussed earlier with respect to FIGS. 1A-1E.

The flap 156 includes a release liner 158 that covers an adhesive 160 on the flap 156. The release liner 158 is the same or similar as the release liner 38 of the shipping container 10*a* as discussed earlier with respect to FIGS. 1A-1E, and the adhesive 160 is the same or similar to the adhesive 36 of the shipping container 10*a* as discussed earlier with respect to FIGS. 1A-1E.

However, unlike the flap 34 of the shipping container 10*a* as shown in FIGS. 1A-1E, the flap 156 includes an extension portion 162 that spaces the release liner 158 further away from the first corrugated medium 138 as compared to a distance the release liner 38 is spaced apart from the first corrugated medium 20 as shown in FIGS. 1A-1E. When the flap 156 is closed to close a shipping container formed by the blank 58*c* as shown in FIGS. 5A-5C, the extension portion 162 provides a higher likelihood of properly adhering the flap 156 to the second portion 140*b* of the outer liner 140.

In some embodiments, the release liner 158 and the adhesive 160 may extend onto the extension portion 162 such that the surface area of the release liner 158 and the adhesive 160 is larger as compared to a surface area of the release liner 158 and the adhesive 160 as shown in FIGS. 5A-5C. The increased surface area of the adhesive 160 increases the strength and robustness of a physical connection between the flap 156 and the second portion 140*b* of the outer liner 140 reducing the likelihood the shipping container formed by the blank 58*c* opens when shipping a product within the shipping container.

Unlike the flap 34 of the shipping container 10*a* as shown in FIGS. 1A-1E, the flap 156 includes a fold line 164 that extends from a first side of the flap 156 to a second side of the flap 156, which is opposite to the first side. The fold line 164 assists when folding the flap 156 to close off a shipping container formed by the blank 58*c* when shipping a product within the shipping container formed by the blank 58*c*.

The blank 58*c* includes a fold line 166 at a location at which the first panel 134 meets the second panel 136. The fold line 166 is at a location at which the first portion 140*a* of the outer liner 140 meets the second portion 140*b* of the outer liner 140. The fold line 166 is about a horizontal axis 168, which passes between the first corrugated medium 138 and the second corrugated medium 142.

The blank 58*c* includes a vertical axis 170 that is transverse to the horizontal axis. The vertical axis 170 may be a centerline axis of the blank 58*c*. The vertical axis 170 may be perpendicular to the horizontal axis 168.

The first panel 134 includes a first lateral seal edge 172 at the left-hand side of the first panel 134 and a second lateral seal edge 174 at the right-hand side of the first panel 134. The first corrugated medium includes a third edge 176 that extends to the first and second lateral seal edges 172, 174. For example, the third edge 176 extends from the first lateral seal edge 172 to the second lateral seal edge 174.

The second panel 136 is a mirror image of the first panel 134 flipped about the vertical axis 170. The second panel 136 is the same or similar as the first panel 134 except for being the mirror image of the first panel 134 flipped about the vertical axis 170. Accordingly, for simplicity and brevity of the present disclosure, only differences or additional features of the second panel 136 will be discussed herein with respect to the first panel 134.

Unlike the first panel 134, the second panel 136 includes a fourth lateral seal edge 178 at the left-hand side of FIG. 5A, a fifth lateral seal edge 180 at the right-hand side of FIG. 5A, and a sixth edge 182 at an end of the second panel 136 furthest away from the first panel 134. The second corrugated medium includes a seventh edge 184 adjacent to the third edge 176 of the first corrugated medium 138. The seventh edge 184 is spaced apart from the third edge 176. The sixth edge 182 and the seventh edge 184 are transverse to the fourth lateral seal edge 178 and the fifth lateral seal edge 180. The sixth edge 182 and the seventh edge 184 extend from the fourth lateral seal edge 178 to the fifth lateral seal edge 180. For example, the sixth edge 182 extends from the fourth lateral seal edge 178 to the fifth lateral seal edge 180, and the seventh edge 184 extends from the fourth lateral seal edge 178 to the fifth lateral seal edge 180.

In some embodiments, the first corrugated medium 138 and the second corrugated medium 142 are integral each other such that the first corrugated medium 138 and the second corrugated medium 142 are made of a single, continuous material. When the first and second corrugated mediums 138, 142 are integral each other, the third edge 174 and the seventh edge 184 are not present, and instead, the first and second corrugated mediums 138, 142 are integrally coupled to each other by a portion extending from the first corrugated medium 138 to the second corrugated medium 142. The portion covers the fold line 166 such that when folding the blank 58*c* to form a shipping container, the portion between the first and second corrugated mediums 138, 142 is folded with the outer liner 140 along the horizontal axis 168 based on the orientation in FIG. 5A.

When forming a shipping container utilizing the blank 58*c*, the side edge extension 150 of the first panel 134 wraps around the fifth lateral seal edge 180 of the second panel 136 and the second lateral seal edge 174 is adhered to the second portion 140*b* of the outer liner 140, and the side edge extension 150 of the second panel 136 wraps around the first lateral seal edge 172 of the first panel 134 and the fourth lateral seal edge 178 is adhered to the first portion 140*a* of the outer liner 140.

Similar to the first and second flutes 126, 128 as shown in FIG. 4D that have different widths, the first and second flutes 144, 146 have different widths like the first and second flutes 126, 128. The first flutes 144 have a first width and the second flutes 146 have a second width that is less than the first width. The first flutes 144 are taller than the second flutes 146. This difference in the heights and widths of the first and second flutes 144, 146 can be more readily appreciated in view of FIG. 5C.

As shown in FIG. 5C, the second flutes 146 are less tall and wide than the first flutes 144. The second flutes 146 being less tall and wide than the first flues 144 allow the side edge extensions 150 of the first and second panels 134, 136 to more readily wrap around a corresponding one of the lateral seal edges 172, 180, respectively, and be adhered to the first and second portions 140*a*, 140*b*, respectively, of the outer liner 140. For example, the less tall and wide second flutes 146 allow the side edge extensions 150 to be more easily folded reducing stress on an adhesive 230 that is utilized to adhere the side edge extensions 150 to the outer liner as compared to the second flutes 146 had the same height and width as the first flutes 144. If the second flutes 146 had the same height and width as the larger first flutes 144, the second flutes 146 would more readily pull away from the adhesive 230 increasing the likelihood of the side edge extensions 150 becoming detached from the outer liner 140.

As shown in FIG. 5B, the flap 156 of the outer liner 140 includes a tear strip 186. When the tear strip 186 is pulled and torn off, the tear strip 186 is removed and the tear strip 186 detaches a portion of the flap 156 that has been adhered to the second portion 140*b* of the outer liner 140 allowing a consumer, a customer, or a buyer to access an interior pocket of the shipping container formed by the blank 58*c*. In other words, the tear strip 186 allows a customer, a consumer, or a buyer access a product shipped within the shipping container formed from the blank 58*c*.

The results of this forming of a shipping container from the blank 58*c* can be readily seen in FIG. 5C, and the structure of the shipping container formed by the blank 58*c* is readily apparent in view of the earlier discussion with respect to FIGS. 5A and 5B. Accordingly, for the sake of simplicity and brevity of the present disclosure, a detailed discussion with respect to the FIGS. 5A and 5B is not reproduced within the present disclosure herein to describe FIG. 5C. As in other embodiments, flutes of first corrugated medium 138 can be offset from the flutes of the second corrugated medium 142 when the shipping container of FIGS. 5A-5C is constructed.

FIG. 6 is directed to a blank 58*d* that is utilized to form a shipping container. The blank 58*d* is the same or similar as the blank 58*c* discussed earlier with respect to FIGS. 5A-5C. Accordingly, for the sake of simplicity and brevity of the present disclosure, only different or additional features of the blank 58*d* will be discussed in further detail with respect to the blank 58*c* as shown in FIGS. 5A-5C. As in other embodiments, flutes of corrugated medium of panel 134 can be offset from the flutes of the corrugated medium of panel 136 when the shipping container of FIG. 6 is constructed.

Unlike the blank 58*c*, a first panel 134 of the blank 58*d* includes a plurality of first score lines 188 being at a first angle and a plurality of second score lines 190 at a second angle. The first score lines 188 and the second score lines 190 overlap each other forming a diamond shape pattern on flutes 144 of the first panel 134. A second panel 136 of the blank 58*d* does not include any score lines. However, in some embodiments, the second panel 136 may include score lines similar to the embodiment of the blank 58*b* as shown in FIG. 5A.

The blank 58*d* includes a first lateral seal edge 192 at the left-hand side of the first panel 134 as shown in FIG. 6. The blank 58*d* includes a second lateral seal edge 194 at the right-hand side of the first panel 134 as shown in FIG. 6. The blank 58*d* includes a third lateral seal edge 196 at the left-hand side of the second panel 136 as shown in FIG. 6. The blank 58*d* includes a fourth lateral seal edge 198 at the right-hand side of the second panel 136 as shown in FIG. 6.

A first adhesive layer 200 is on and covers the first lateral seal edge 192 of the first panel 134, and a second adhesive layer 202 is on and covers the second lateral seal edge 194 of the first panel 134. The first adhesive layer 200 adheres the first lateral seal edge 192 to the third lateral seal edge 196, and the second adhesive layer 202 adheres the second lateral seal edge 194 to the fourth lateral seal edge 198 when utilizing the blank 58*d* to form a shipping container.

FIG. 7 is directed to an alternative embodiment of a blank 58*e* that is the same or similar as the blank 58*c* as shown in FIGS. 5A-5C. Accordingly, only differences or additional features of the blank 58*e* will be discussed in further detail with respect to the blank 58*c* as shown in FIGS. 5A-5C.

Unlike the blank 58*c*, the blank 58*e* has score lines 204 on flutes 144, 146 of a first and second panel 134, 136, respectively, that have a zig-zag pattern. The score lines 204 function in the same or similar manner as the score lines 30, 32 as discussed with respect to FIGS. 1A-1E. Accordingly, for the sake of simplicity and brevity of the present disclosure, the functionality of the score lines 204 has not been discussed herein FIG. 8 is directed to an alternative embodiment of a blank 58*f* that is the same or similar as the blank 58*c* as shown in FIGS. 5A-5C and the blank 58*d* as shown in FIG. 6. In other words, the blank 58*f* includes some of the same or similar features as the blank 58*c* in combination with some of the same or similar features as the blank 58*d*. Accordingly, only differences or additional features of the blank 58*f* will be discussed in further detail with respect to the blank 58*d* as shown in FIG. 6.

Unlike the blank 58*d*, the blank 58*f* includes first flutes 144 that have a first width and a first height that are on the left-hand side and the right-hand side of second flutes 146 that have a second width and a second height that are less than the first width and the first height, respectively, as shown in FIG. 8. The second flutes 146 are positioned closer to a center line of the blank 58*f* relative to the second flutes 146 of the blank 58*c* as shown in FIG. 5A and the blank 58*e* as shown in FIG. 7.

Unlike the blank 58*d*, the blank 58*f* has a plurality of first score lines 188 and a plurality of second score lines 190 that cross over and overlap each other forming a diamond shaped patterns on flutes 144, 146 of the first panel 134. The blank 58*f* includes a plurality of third score lines 206 and a plurality of fourth score lines 208 that cross over and overlap each other forming diamond shaped patterns on flutes 144, 146 of the second panel 136. The diamond shaped patterns on the first panel 134 are smaller as compared to the diamond shaped patterns on the second panel 136.

The second flutes 146 being centrally located between ones of the first flutes 144 allow a shipping container formed by the blank 58*f* to be more readily conformable to a product within the shipping container. For example, the second flutes 146 being smaller and less high will have greater foldability, flexibility, and bendability relative to the larger first flutes 144. Therefore, the second flutes 146 will more readily conform to a product positioned within an interior pocket of the shipping container formed from the blank 58*f* as compared to if only the first flutes 144 were present and the second flutes 146 were not present.

The location of the second flutes 146, which are smaller in height and width as compared to the first flutes 144, may be pre-selected based on a shape or size of a product that is regularly shipped by a retailer. In other words, the location of the second flutes 146 is customizable to be tailored for a specific shape and size of a specific product such that the shipping container formed from the blank 58*f* will more readily conform to the specific shape and size of the specific product as compared to another shipping container that is not customized for the specific shape and size of the specific product.

FIGS. 9A-9D are directed to embodiments of patterns formed by score lines on either a first panel or a second panel of embodiments of blanks or shipping containers of the present disclosure.

As shown in FIG. 9A, a first scoring pattern 210*a* includes first scoring lines 212 and second scoring lines 214. The first scoring lines 212 and the second scoring lines 214 are transverse to each other such that the first scoring lines 212 and the second scoring lines 214 overlap and cross over forming a diamond shaped pattern. The first scoring lines 212 and the second scoring lines 214 may be transverse to each other by an angle of substantially 90-degrees such that the diamonds are rotated squares. The diamond shaped pattern includes a plurality of diamonds.

As shown in FIG. 9B, a second scoring pattern 210*b* includes first scoring lines 212 and second scoring lines 214, which are the same or similar as the first scoring lines 212 and the second scoring lines 214 as previously discussed with respect to FIG. 9A.

The second scoring pattern 210*b* includes third scoring lines 216 that are horizontal based on the orientation of the second scoring pattern 210*b* as shown in FIG. 9B. The first, second, and third scoring lines 212, 24, 216 overlap and cross over forming a triangular shaped pattern. The triangular shaped pattern includes a plurality of triangles.

As shown in FIG. 9C, a third scoring pattern 210*c* includes first scoring lines 218 and second scoring lines 220. The first scoring lines 218 and the second scoring lines 220 are transverse to each other such that the first scoring lines 218 and the second scoring lines 220 overlap and cross over forming a diamond shaped pattern. The first scoring lines 218 and the second scoring lines 220 may be transverse to each other by an angle greater than 90-degrees. The diamond shaped pattern includes a plurality of diamonds.

Unlike the diamond shaped patterns in FIG. 9A, the diamond shaped patterns as shown in FIG. 9C are rotated parallelograms instead of rotated squares as the first scoring lines 218 and the second scoring lines 220 are at an angle relative to each other that is greater than 90-degrees.

As shown in FIG. 9D, a fourth scoring pattern 210*d* includes first scoring lines 218 and second scoring lines 220, which are the same or similar as the first scoring lines 218 and the second scoring lines 220 as previously discussed with respect to FIG. 9C. The fourth scoring pattern 210*d* includes third scoring lines 222 that are horizontal based on the orientation of the fourth scoring pattern 210*d* as shown in FIG. 9D. The first, second, and third scoring lines 218, 220, 222 overlap and cross over forming a triangular shaped pattern. The triangular shaped pattern includes a plurality of triangles.

Unlike the triangular shaped pattern as shown in FIG. 9B, the triangular shaped pattern in FIG. 9D have triangles that are wider than the triangles in the triangular shaped pattern as shown in FIG. 9B.

FIGS. 10A-10C are directed to end profiles of at least three non-perforated score lines 224 formed in a flute 226 in a corrugated medium 228. In FIGS. 10A-10C, the length of the flute extends left to right. It should be understood that the present disclosure is not limited to these score line patterns or profiles. In some embodiments, the score lines 224 may be perforated score lines. The profiles of the score lines 224 may be profiles of score lines in various embodiment of shipping containers and blanks to form the shipping containers as disclosed within the present disclosure or within the scope of the present disclosure.

FIGS. 11A-11D are directed to embodiments of seals formed between a first panel 134 and a second panel 136 of embodiments of blanks that are coupled together to form a shipping container from the embodiments of the blanks as disclosed within the present disclosure.

Figure 11A:
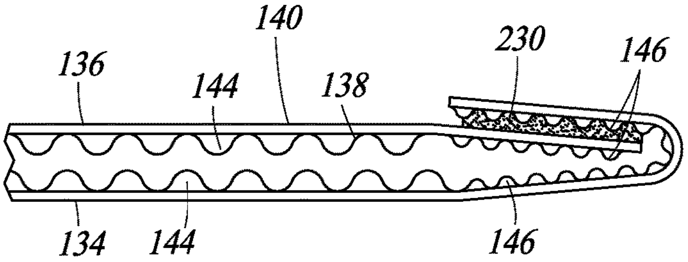

FIG. 11A is a depiction of how the side edge extension 150 is wrapped around the fifth lateral seal edge 180 to adhere the second lateral seal edge 174 to the second portion 140*b* of the outer liner 140 of the blank 58*a* as shown in FIG. 5A. An adhesive 230 couples second flutes 146 to the outer liner 140.

Figure 11B:
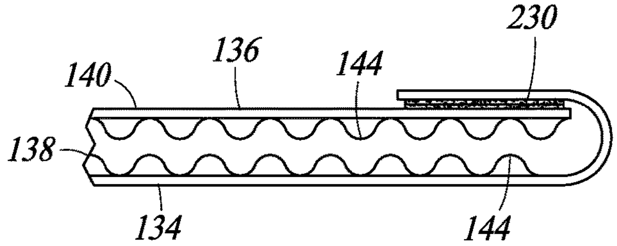

FIG. 11B is a depiction of how the side edge extension 150 is wrapped around the fifth lateral seal edge 180 to adhere the second lateral seal edge 174 to the second portion 140*b* of the outer liner 140 of the blank 58*a* as shown in FIG. 5A. However, unlike FIG. 11A, the flutes 146 are not present. Instead, in FIG. 11B, an adhesive 230 couples an inner surface of an end of the first panel 134 to a portion of the outer liner 140 of the second panel 136.

Figure 11C:
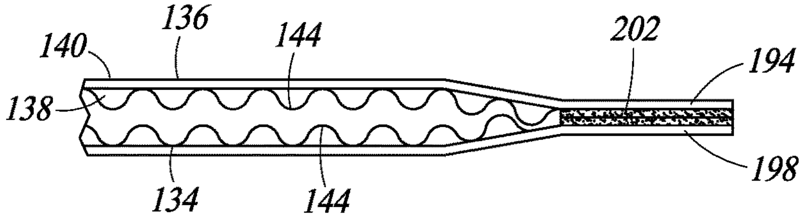

FIG. 11C is a depiction of how the second lateral seal edge 194 of the first panel 134 is adhered to the fourth lateral seal edge 198 of the second panel 136 of the blank 58*d*. The adhesive 202 couples the first lateral seal edge 192 of the first panel 134 to the fourth lateral seal edge 198 of the second panel 136.

Figure 11D:
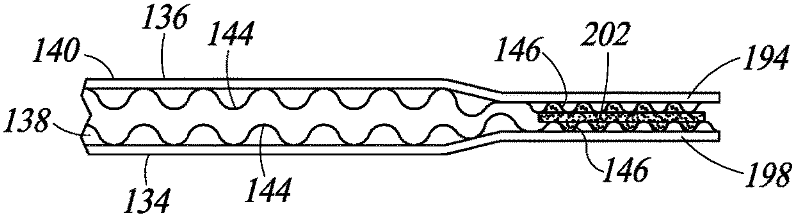

FIG. 11D is a depiction of how the second lateral seal edge 194 of the first panel 134 is adhered to the fourth lateral seal edge 198 of the second panel 136 of the blank 58*d*. However, unlike FIG. 11C, flutes 146 are on inner surfaces of ends of the second lateral seal edge 194 and the fourth lateral seal edge 198. The adhesive 202 couples the flutes 146 at the inner surfaces of the ends of the second lateral seal edge 194 and the fourth lateral seal edge 198 to each other.

FIGS. 12A and 12B are directed to forming an alternative embodiment of a shipping container utilizing a blank 58*g*, which may be the blank 58*g* that is utilized for forming the shipping container 10*b* as shown in FIGS. 4A-4D.

As shown in FIG. 12A, the blank 58*g* includes a flap 34 that is the same or similar as the flap 34 as shown in FIGS. 4A-4D, the flutes 124, 126, 128, 130 are the same or similar as the flutes 124, 126, 128, 130 as shown in FIGS. 4A-4D, and a support flap 132 that is the same as the support flap 132 as shown in FIGS. 4A-4D.

As shown in FIG. 12B, a first portion of the support flap 132 is folded over and attached to an inner surface of a second portion of the support flap 132. The first portion of the support flap 132 is adhered to the inner surface of the second portion of the support flap 132 by an adhesive 232. The flap 34 is folded over and coupled to the second panel 136 by an adhesive 234, and when the flap 34 is folded over and coupled to the second panel 136, the interior pocket 15 is closed off by the flap 34, which covers the product 114 within the shipping container 10*b* as shown in FIG. 4D.

FIG. 13 is directed to a corrugating machine 300 that may be utilized to form blanks, which are utilized to form shipping containers of the present disclosure. The corrugating machine 300 utilizes a web material 302 (e.g., a first sheet material) and a liner material 304 (e.g., a second sheet material).

The corrugating machine 300 includes a first roller 305, which may be a medium web entry roller. The first roller 305 pulls the web material 302 into the corrugating machine 300, and the first roller 305 directs the web material 302 to at least a first corrugating roller 306 and a second corrugating roller 308. The first roller 305 may be pre-heated to warm up the web material 302 such that the corrugating rollers 306, 308 may more readily form flutes on the web material 302 as the web material 302 passes through and between the corrugating rollers 306, 308.

The corrugating rollers 306, 308 form the flutes on the web material 302 when the web material 302 passes between the first and second corrugating rollers 306, 308. The flutes of the web material 302 are the same or similar as the flutes in embodiments of the shipping containers and embodiments of the blanks as discussed earlier in the present disclosure.

The first and second corrugating rollers 306, 308 both have teeth that form the flutes. The teeth of the first corrugating rollers 306 and the second corrugating rollers 308 interlock with each other such that the first corrugating roller 306 and the second corrugating roller 308 rotate together. For example, the first corrugating roller 306 rotates in a first direction (e.g., counterclockwise rotation), and the second corrugating roller 308 rotates in a second direction (e.g., clockwise rotation) opposite to the first direction. In some embodiments, the first and second corrugating rollers 306, 308 may be pre-heated to assist in the formation of the flutes or the corrugations on the web material 302.

The corrugating machine 300 includes a second roller 312, which may be a starch roller. The second roller 312 is adjacent to bottom location of the second corrugating roller 308 based on the orientation of the corrugating machine 300 as shown in FIG. 13. The web material 302, which was previously corrugated to have the flutes by the first and second corrugating rollers 306, 308, passes between the second corrugating roller 308 and the second roller 312. As the web material 302 passes between the second corrugating roller 308 and the second roller 312, the second roller 312 applies a starch material to the web material 302 to stiffen the web material 302 with the flutes before being introduced and attached to the liner material 304.

The corrugating machine 300 includes a third roller 314, which may be pre-heated in a similar manner as the first roller 305 and the first and second corrugated rollers 306, 308 as discussed earlier within the present disclosure. However, unlike the first roller 305, the third roller 314 pre-heats the liner material 304 instead of the web material 302. The liner material 304 may be warmed up by the third roller 314 when the third roller 314 is pre-heated to assist in applying an adhesive to the liner material 304 or adhering the liner material 304 to the web material 302 with flutes by an adhesive.

The corrugating machine 300 includes a fourth roller 315, which may be a pressure roller. The fourth roller 315 is adjacent to a left-hand side of the second corrugating roller 308 based on the orientation of the corrugating machine 300 as shown in FIG. 13. The web material 302, which has already been passed through the first and second corrugating rollers 306, 308 such that the web material has the corrugations or the flutes, and the liner material 304 pass through and between the second corrugation roller 308 and the fourth roller 315. Before the web material 302 with flutes and the liner material 304 pass through and between the fourth roller 315 and the second corrugated roller 308, an adhesive may be applied to a surface of the web material 302, to a surface of the liner material 304, or to surfaces of both the web material 302 and the liner material 304. The adhesive may be a contact adhesive, a heat activated adhesive, or a combination of both a contact adhesive and a heat activated adhesive. As the web material 302 and the liner material 304 pass through and between the second corrugating roller 308 and the fourth roller 315, the web material 302 with flutes and the liner material 304 are adhered together by the adhesive. The web material 302 with the flutes and the liner material 304 adhered together may be referred to as a single face corrugate web material.

Once the web material 302 with the flutes is adhered to the liner material 304, the web material 302 and the liner material 304 leave the corrugating machine 300. After the web material 302 with the flutes that is adhered to the liner material 304 exits the corrugation machine 300, the web material 302 with the flutes and the liner material 304 adhered to the web material 302 may be further processed to form embodiments of blanks, which may be utilized in forming shipping containers of the present disclosure or within the scope of the present disclosure.

In other words, in view of the earlier discussion, the web material 302 is first pulled into the corrugating machine 300 by the first roller 305. After the web material 302 enters the corrugating machine 300, the web material 302 is then passed through and between the first and second corrugating rollers 306, 308 forming and patterning flutes or corrugations onto the web material 302. After the flutes or the corrugations are formed on the web material 302, the web material 302 passes between the second roller 312 and the second corrugating roller 306 at which point the starch material is applied to the web material 302. At a concurrent time of the starch material being applied to the web material 302, the liner material 304 is pulled into the corrugating machine by the third roller 314. After the starch has been applied to the web material 302 with flutes or corrugations, the web material 302 is adhered to the liner material 304 by an adhesive by passing the web material 302 and the liner material 304 through and between the fourth roller 315 and the second corrugating roller 308. After the web material 302 with flutes is adhered to the liner material 304, the web material 302 adhered to the liner material 304 exits the corrugating machine 300 and may be further processed to form embodiments of blanks, which may be utilized to form shipping containers of the present disclosure or within the scope of the present disclosure.

The web material 302 may be a paper material, a recycled paper material, a plastic material, a recycled plastic material, a recyclable paper material, a recyclable plastic material, or some other recyclable or recycled material.

The liner material 304 may be a paper material, a recycled paper material, a plastic material, a recycled plastic material, a recyclable paper material, a recyclable plastic material, or some other recyclable or recycled material.

In the preferred embodiments, the web material 302 and the liner material 304 are made of the same type of recyclable material such that a consumer, customer, or buyer may throw a shipping container formed by the web material 302 and the liner material 304 directly into a recycling bin to properly recycle the shipping container without breaking the shipping container down beforehand.

FIGS. 14A and 14B are directed to an embodiment of the first and second corrugating rollers 306, 308 in the corrugating machine 300 as discussed earlier with respect to FIG. 13. For the sake of simplicity and brevity of the present disclosure, only one of the corrugating rollers 306, 308 will be described in detail. However, the description of one of the corrugating rollers 306, 308 will apply to the other corrugating roller 306, 308 as well.

FIG. 14C is directed to an alternative embodiment of the first and second corrugating rollers 306, 308 in the corrugating machine 300 as discussed earlier.

It will be readily appreciated that the embodiment of the first corrugated roller 306 as shown in FIG. 14A may be extended further outward in the direction the teeth extend such that alternative embodiments of the corrugated roller 306 are longer than as shown in FIG. 14A.

It will be readily appreciated that while the embodiment of the first corrugated roller 306 as shown in FIG. 14A may be a solid, in some alternative embodiments, the roller 306 may instead be hollow, which can be more readily seen in FIGS. 16A and 16B. In some embodiments, one of the corrugating rollers 306, 308 may be hollow and the other of the corrugating rollers 306, 308 may be solid.

As shown in FIG. 14A, the first corrugating roller 306 includes a first end 316 and a second end 318 opposite to the first end 316. The first corrugating roller rotates about a central axis A. The first corrugating roller 306 includes first regions 320 and second regions 322 along an outer surface of the first corrugating roller 306. The first regions 320 may be flat regions, e.g., regions without flutes or teeth, and the second regions 322 may be a plurality of "B" sized flute regions at which a plurality of "B" sized flutes or teeth are located. The first regions (e.g., flat regions, flat surfaces, etc.) 320 extend from the first end 316 to the second end 318. The second regions (e.g., flute regions, flute surfaces) 322 extend from the first end 316 to the second end 318. The flutes at the second regions 322 are horizontally aligned based on the orientation of the first corrugating roller 406 as shown in FIGS. 14A and 14B. The flutes extend in a direction parallel with the central axis A.

The "B" sized flutes may have a height at a peak of the flute that is substantially equal to ⅛-inches. The "B" sized flutes may have a height at a peak of the flute ranging from 0.125-inches to 0.16-inches. The "B" sized flutes may have a width between respective adjacent peaks of flutes substantially equal to ⅛-inches. The "B" sized flutes may have a width between adjacent peaks of flutes ranging from 0.125-inches to 0.16-inches.

As shown in FIG. 14C, an alternative embodiment of the corrugating rollers 306, 308 have flutes at the first regions 320 that are smaller than flutes at the second regions 322 of the corrugating rollers 306, 308.

In some alternative embodiments, the first regions 320 may have flutes that are differently sized than the flutes at the second regions 322. For example, the flutes at the second regions 322 may be "B" sized flutes and the flutes at the first regions 320 may be "N" sized flutes. As an alternative example, the flutes at the second regions 322 may be "B" sized flutes and the flutes at the first regions 320 may be "F" sized flutes.

In other words, the first regions 320 may have flutes that have different heights, widths, and/or lengths relative to the flutes that are at the second regions 322. For example, flutes at the first regions 320 may have a first height and flutes at the second regions 322 may have a second height that is less than the first height. In some embodiments, the first height may be greater than the second height.

In some alternative embodiments, the "B" sized flutes at the second regions 322 may be replaced with flutes of any number of sizes (e.g., A, C, E, F, and N sized flutes, or some other type or size of flute), and the first regions 320 may be replaced with flutes of any number of sizes (e.g., A-N sized flutes) that are differently sized than the flutes at the second regions 322.

When the web material 302 passes between and through the first and second corrugated rollers 306, 308, which both have the structure as shown in FIGS. 14A and 14B, the second regions 322 of the first and second corrugated rollers 306, 308 form "B" sized flute regions on the web material 302. When the web material 302 passes between and through the first and second corrugated rollers 306, 308, the first regions 320 form flat regions on the web material 302 that space apart the "B" sized flute regions on the web material 302 formed by the second regions 322. Ones of the flat regions of the web material 302 may be locations at which the web material is cut or singulated into embodiments of blanks within the present disclosure or within the scope of the present disclosure. Ones of the flat regions of the web material 302 may be the same or similar as the fold line 166 as discussed earlier with respect to FIGS. 5A-5C. In other words, the web material 302 has the "B" sized flute regions formed by the second regions 322 of "B" sized flutes on the first and second corrugated rollers 306, 308, and the "B" sized flute regions are spaced apart from each other by flat regions of the web material 302 formed by the first regions 320 on the first and second corrugated rollers 306, 308.

As shown in FIG. 14B, the first and second corrugated rollers 306, 308 have three first regions 320 and three second regions 322. The first regions 320 separate the second regions 322 from each other, and the second regions 322 separate the first regions 320 from each other. In other embodiments, the first and second corrugated rollers 306, 308 have more than three first regions 320 and more than three second regions 322. For example, the first and second corrugated rollers 306, 308 have four or five first regions 320 and four or five second regions 322. In other embodiments, the first and second corrugated rollers 306, 308 have fewer than three first regions 320 and fewer than three second regions 322. For example, the first corrugated rollers 306, 308 have one or two first regions 320 and one or two second regions 322.

FIG. 15 is directed to a corrugating machine 400 that may be utilized to form blank, which may be utilized to form shipping containers of the present disclosure. The corrugating machine 400 utilizes a web material 402 (e.g., a first sheet material) and a liner material 404 (e.g., a second sheet material).

The web material 402 in FIG. 15 is the same or similar as the web material 302 as discussed with respect to FIGS. 13, 14A, and 14B. The liner material 404 is the same or similar to the liner material 304 as discussed with respect to FIGS. 13, 14A, and 14B.

The method of processing the web material 402 and the liner material 404 with the corrugating machine 400 is the same or similar to the method of processing the web material 302 and the liner material 304 as discussed earlier with respect to FIGS. 13, 14A, and 14B. Accordingly, for the sake of simplicity and brevity of the present disclosure, the discussion of the method of processing the web material 402 and the liner material 404 has not been reproduced herein.

The corrugating machine 400 is the same or similar to the corrugating machine 300. However, unlike the corrugating machine 300, the corrugating machine 400 utilizes a first corrugating roller 406 and a second corrugating roller 408 that are different from the first and second corrugating rollers 306, 308 as shown in FIGS. 14A and 14B. The different structure of the first and second corrugating rollers 406, 408 in the corrugating machine 400 will be discussed as follows with respect to FIGS. 16A and 16B.

FIGS. 16A-16B are directed to an embodiment of the first and second corrugating rollers 406, 408 in the corrugating machine 400 as discussed earlier with respect to FIG. 15. For the sake of simplicity and brevity of the present disclosure, only one of the corrugating rollers 406, 408 will be described in detail. However, the description of one of the corrugating rollers 406,408 will apply to the other corrugating roller 406, 408 as well.

As shown in FIGS. 16A and 16B, the first corrugating roller has a first end 409 and a second end 411 that is opposite to the first end 409.

As shown in FIGS. 16A and 16B, the first corrugating roller 406 includes first regions 410, second regions 412, third regions 414, and fourth regions 416 along an outer surface of the first corrugating roller 406. The first region 410 is flat (e.g., flat surface, flat region, free of flutes or teeth, etc.), and the second, third, and fourth regions 412, 414, 416 have flutes or teeth and may be referred to as fluted regions (e.g., regions with groups of flutes).

As shown in FIG. 16B, the first regions 410 extend from the first end 409 to the second end 411 of the first corrugation roller 406 parallel to central axis A. The first regions 410 separate groups of the second, third, and fourth regions 412, 414, 416 from each other.

For the sake of brevity and simplicity of the present disclosure, the group of the second, third, and fourth region 412, 414, 416 as shown in FIG. 16B will be discussed alone. However, it will be readily appreciated that the discussion of the group of the second, third, and fourth region 412, 414, 416 as shown in FIG. 16B will also apply to other groups of the second, third, and fourth regions 412, 414, 416 of the corrugated rollers 406, 408.

As shown in FIG. 16B, the fourth region 416 is between the second region 412, which is adjacent to the first end 409, and the third region 414, which is adjacent to the second end 411. The second region 412 extends from the first end 409 to the fourth region 416. The third region 414 extends from the second end 411 to the fourth region 416. The second region 412 and the third region 414 are separated from and spaced apart from each other by the fourth region 416.

As can be seen in FIGS. 16A and 16B, the second, third, and fourth regions 412, 414, 416 extend around the circumference of the roller 406, 408 from one of the first regions 410 to another of the first regions 410 such that the fourth region 416 separates the second region 412 from the third region 414.

As can be seen in FIG. 16B, the flutes of the second region 412 and the flutes at the third region 414 are offset from each other and the flutes at the fourth region 416 extend from ends of ones of the flutes at the second region 412 to ends of ones of the flutes at the third region 414. In other words, the peak of a flute of the fourth region 416 aligns with or mates with and extends from a peak of a flute of the second region 412 and the same peak of the flute of the fourth region 416 aligns with or mates with and extends to a peak of a flute of the third region 414. In the embodiment of FIGS. 16A and 16B, the flute of the second region 412 mated with the flute of the fourth region 416 is offset, around the circumference of the roller, from the flute of the third region 414 which is also mated with the same flute of the fourth region 416. In other words, peaks of the flutes of the second region 412 are horizontally aligned (in a direction parallel to central axis A) with valleys of the flutes of the third region 414, and valleys of the flutes of the second region 412 are horizontally aligned with peaks of the flutes of the third region 414. This offset between the flutes of the second region 412 and the flutes of the third region 414 results in the flutes of the fourth region 416 being angled relative to the flutes of the second and third regions 412, 414, respectively. In other words, the flutes of the fourth region 416 are transverse to the flutes of the second and third regions 412, 414, respectively.

In some embodiments, the flutes of the second, third, and fourth regions 412, 414, 416 are integral each other such that the flutes at the second region 412 are first portions of the flutes, the flutes at the third region 414 are second portions of the flutes, and the flutes at the fourth region 416 are third portions of the flutes. In other words, each one of the first portions is made of a material integral and continuous with a corresponding one of the second portions and a corresponding one of the third portions.

In some embodiments, the flutes of the second, third, and fourth regions 412, 414, 416 may be separate and distinct from each other. For example, the flutes at the second region 412 are spaced apart from the flutes at the fourth region 416 by a first slit between the second region 412 and the fourth region 416, and the flutes at the third region 414 are spaced apart from the flutes at the fourth region 416 by a second slit between the third region 414 and the fourth region 416.

This offset of the flutes of the second region 412 and the flutes of the third region 414 relative to each other forms the flutes on the web material 402 in the offset manner as shown in FIG. 1E such that peaks of the flutes on the web material 402 formed by the second region 412 nest within the valleys of the flutes on the web material 402 formed by the third region 414, and peaks of the flutes formed by the third region 414 nest within valleys of the flutes on the web material 402 formed by the second region 412.

The flutes of the fourth region 416, which are at an angle relative to the flutes of the second region 412 and the third region 414, may be at the fold line 68 as shown in FIG. 2. The angle of the flutes at the fourth region 416 may form flutes in the corrugated medium that assist in folding a blank in the region of the blank where the flutes formed by the fourth region of the first and second corrugating rollers 406, 408 to form a shipping container from the blank. As discussed earlier with respect to FIG. 2, flutes on a blank formed by the flutes at the fourth region 416 may be crushed similar to the crushed area 67*b* as discussed earlier with respect to FIG. 2.

The flutes at the second and third regions 412, 414 may have substantially the same width. However, in some embodiments the widths of the flutes at the second and third regions 412, 414 may be different from each other.

In some embodiments, the flutes at the second and third regions 412, 414 have widths that are larger than a width of the flutes at the fourth region 416. In some embodiments, the width of the flutes at the fourth region 416 may be relatively the same size as the widths of the flutes at the second and third regions 412, 414.

The flutes at the second, third, and fourth regions 412, 414, 416, respectively, may be referred to as a first group of flutes, a second group of flutes, and a third group of flutes.

In some embodiments, instead of being flat regions, the first regions 410 may be also have flutes similar to the flutes at the second, third, and fourth regions 412, 414, 416. In some embodiments, the first regions 410 may not be present.

In some embodiments, the first regions 410 may have flutes that are different heights, widths, and/or lengths relative to flutes that are at the second, third, and fourth regions 412, 414, 416. For example, flutes at the first regions 410 may have a first height and flutes at the second, third, and fourth regions 412, 414, 416 may have a second height that is less than the first height. In some embodiments, the first height may be greater than the second height. In some embodiments, the first height may be substantially equal to the second height such that the first regions 410 are not present.

The first region 410 of the first corrugating roller 406 is the same or similar as the first regions 320 of the first corrugating roller 306 as discussed with respect to FIG. 14A. Accordingly, for the sake of simplicity and brevity, further details of the first region 410 as shown in FIGS. 16A and 16B will be readily apparent in view of the earlier discussion of with respect to the first region 320 as shown in FIGS. 14A and 14B.

As shown in FIGS. 16A and 16B, the corrugating rollers 406, 408 is hollow unlike the corrugating rollers 306, 308 as shown in FIGS. 14A and 14B. In some embodiments, the corrugating rollers 406, 408 may be solid like the first corrugating roller 306 as shown in FIGS. 14A and 14B. In some embodiments, one of the corrugating rollers 406, 408 may be hollow and the other of the corrugating rollers 406, 408 may be solid.

As shown in FIG. 16C, adjacent ones of peaks of the flutes at the second region 412 are spaced apart by a dimension D3, adjacent ones of peaks of the flutes at the third region 414 are spaced by a dimension D4. The fourth region has a dimension D5 that extends from ends of the flutes at the second region 412 directly adjacent to the fourth region 416 to ends of the flutes at the third region 414 directly adjacent to the fourth region 416. In some embodiments D3 is equal to D4. The flutes at the fourth region 416 are at an angle Θ relative to the peaks of the flutes at the second region 412. The angle Θ is defined by the dimensions D3, D4, D5 as shown in FIG. 16C. For example, as the dimension D5 gets larger the angle Θ gets smaller, and alternatively, as the dimension D5 gets smaller the angle Θ gets larger. For example, as the dimensions D3, D4 get larger in an equal amount the angle Θ will remain unchanged provided D5 remains constant. In view of the earlier discussion, the angle Θ may be selected based on the dimensions D3, D4, D5 as shown in FIG. 16C. For example, the tangent of angle Θ would be equal D4 divided by D5. Angle Θ is also characterized by a sine of angle Θ that is equal to D4 divided by the length of the flute of section 416 (e.g., the hypotenuse).

In some embodiments, instead of the fourth region 416 having a plurality of flutes present, a flat region without flutes may be present. For example, the flat region includes a flat surface that curves around the circumference of the corrugated roller 406, 408. The flat surface may be substantially coplanar and flush with ones of the peaks of flutes at the second region 412.

In some embodiments, the flat surface may be substantially coplanar and flush with the peaks of flutes at the second and third regions 412, 414, respectively. In some other embodiments, the flat surface at the fourth region 416 may be substantially coplanar and flush with the peaks of flutes at the third region 414.

In some embodiments the flat surface may be substantially coplanar and flush with the valleys of the flutes at the second and third regions 412, 414, respectively. In some other embodiments, the flat surface at the fourth region 416 may be substantially coplanar and flush with valleys of the flutes at the second region 412. In some other embodiments the flat surface at the fourth region 416 may be substantially coplanar and flush with the valleys of flutes at the third region 414.

In some embodiments, when the fourth region 416 is a flat surface, the flat surface of the fourth region 416 may be substantially coplanar and flush with the flat surface of first region 410. In some other embodiments, when the fourth region 415 is a flat surface, the flat surface of the fourth region 416 may be recessed within the corrugating roller 406, 408 such that the flat surface of the fourth region 416 is closer to the central axis A than the flat surface at the first region 410. When the fourth region 416 is the flat surface that is recessed within the corrugating roller 406, 408 the flat surface may be a surface of a recess, a groove, or a slit that spaces apart the second region 412 from the third region 414. The width of the fourth region 416 that is a flat surface that is recessed within the corrugating roller 406, 408 can vary. For example, width may be on the order of tenths of an inch or it may be on the order of inches wide.

The corrugating rollers 306, 308, 406, 408 as shown in FIGS. 14A, 14B, 16A, and 16B may be made of a hardened material or a non-hardened material that is softer than the hardened material. For example, the hardened material may be a hardened steel material, a hardened steel alloy material, a hardened alloy material, or some other suitable type of hardened material. For example, the non-hardened material may be a non-hardened steel material, a non-hardened steel alloy material, a non-hardened alloy material, or some other suitable type of non-hardened material.

If the corrugating rollers 306, 308, 406, 408 are made of a hardened material, the length of time to manufacture the corrugating rollers is relative long as compared to if the corrugating rollers are made of a non-hardened material. The length of time to manufacture the corrugating rollers 306, 308, 406, 408 is longer as the tooling time to form flutes on the outer surfaces of the hardened material takes longer than the tooling time to manufacture the corrugating rollers from the softer, non-hardened material.

However, if the corrugating rollers 306, 308, 406, 408 are made of a hardened material, the corrugating rollers 306, 308, 406, 408 generally will have longer useful life spans as the hardened material is less susceptible to damage such as breaks, cracks, chips, or other deformations in the flutes relative to when the corrugating rollers 306, 308, 406, 408 are formed from the non-hardened material.

Although the corrugating rollers 306, 308, 406, 408 formed from the hardened material generally will have longer useful life spans, if the corrugating rollers 306, 308, 406, 408 are made of the non-hardened material and get damaged during use (e.g., chips, cracks, breaks, etc.), the corrugating rollers 306, 308, 406, 408 made of the non-hardened material may be re-tooled more easily and quickly to fix the damage as compared to re-tooling the corrugating rollers 306, 308, 406, 408 when made of the hardened material.

The corrugating rollers 306, 308, 406, 408 as shown in FIGS. 14A, 14B, 16A, and 16B may be ones of a plurality of corrugating rollers 306, 308, 406, 408 that are incorporated in the corrugating machines 300, 400. For example, multiple rollers may be positioned and aligned with each other such that if one of the corrugating rollers 306, 308, 406, 408 breaks, the broken corrugating roller 306, 308, 406, 408 may be quickly swapped out and replaced by a new corrugating roller 306, 308, 406, 408. In other words, the corrugating rollers 306, 308, 406, 408 may be part of a modular corrugating roller system in which multiples of the corrugating rollers 306, 308, 406, 408 are placed on a single rotation member (e.g., rotation axel, rotating cylindrical member, etc.).

In some embodiments, the first, second, third, and fourth regions 410, 412, 414, 416 of the corrugating rollers 406, 408 may be modular such that the first, second, third, and fourth regions 410, 412, 414, 416 may be individually replaceable. For example, if ones of the flutes at the third region 414 of one of the corrugating rollers 406, 408 were to become deformed (e.g., breaks, cracks, dents, etc.), the flutes of the deformed third region 414 may be removed from the corrugating roller 406, 408, and a new, non-deformed third region 414 with flutes would be positioned on the corrugating roller 406, 408 to replace the deformed third region 414.

FIG. 17 is directed to a scoring machine 500 that forms scores lines of embodiments of blanks, which may be utilized to form shipping containers within the present disclosure or within the scope of the present disclosure.

A sheet material 502 includes a web material that has been corrugated with flutes and a liner material adhered to the fluted web material. The sheet material 502 is the same or similar as the fluted web material 402 that is adhered to the liner material 404 as discussed earlier with respect to FIG. 15. The fluted sheet material 502 enters the scoring machine 500 at the right-hand side of FIG. 17.

The fluted web material of the sheet material 502 is the same as the web material 402 as discussed with respect to FIG. 15. The liner material of the sheet material 502 is the same or similar as the liner material 404 as discussed earlier with respect to FIG. 15.

The scoring machine 500 includes a first crushing roller 504. The first crushing roller 504 may crush flutes of the fluted web material of the sheet material 502 that passes through the scoring machine. For example, the first crushing roller 504 may crush the flutes of the web material of the sheet material 502 forming the crushed areas 67*a*, 67*b*, 67*c* as shown in FIG. 2.

The scoring machine 500 includes a first scoring roller 506 and a second scoring roller 508 that scores the fluted web material of the sheet material 502. The first and second scoring rollers 506, 508 are configured to form score lines on the flutes of the fluted web material of the sheet material 502. For example, the score lines are the same or similar as the score lines as shown in FIGS. 1A-1E, 2, 3, 4A-4D, 5A-5C, 6, 7, 8, and 9A-9D. Accordingly, for the sake of simplicity of the present disclosure, the structural features of the score lines formed by the scoring machine 500 will not be discussed in further detail herein.

In some embodiments, only one of the first and second scoring rollers 506, 508 may score a single side of the sheet material 502. In some embodiments, both the first and second scoring rollers 506, 508 may score both sides of the sheet material 502. The scoring rollers 506, 508 will be discussed in further detail with respect to embodiments of the scoring rollers 506, 508 as shown in FIGS. 18 and 19.

The scoring rollers 506, 508 may be pre-heated to assist in compressing portions of the flutes of the sheet material 502 to form the score lines as shown in FIGS. 1A-1E, 2, 3, 4A-4D, 5A-5C, 6, 7, 8, and 9A-9D.

The scoring machine 500 includes a second crushing roller 510. The second crushing roller 510 may crush flutes of the fluted web material of the sheet material 502 that passes through the scoring machine. For example, the second crushing roller 510 may crush the flutes of the web material of the sheet material 502 forming the crushed areas 67*a*, 67*b*, 67*c* as shown in FIG. 2.

When the sheet material 502 exits the scoring machine 500, the flutes of the web material of the sheet material 502 may have score lines as shown in FIGS. 1A-1E, 2, 3, 4A-4D, 5A-5C, 6, 7, 8 and 9A-9D.

FIG. 18 is directed to at least one of the scoring rollers 506, 508, which includes a diamond shaped patterns 511. The scoring rollers 506, 508 include a first set of spiral protrusions 512 that extend in a first direction and a second set of spiral protrusion 514 that extend in a second direction transverse to the first direction. The first set of spiral protrusions 512 and the second set of spiral protrusions 514 overlap and cross over each other forming the diamond shaped patterns 511. These diamond shaped patterns 511 of the scoring roller 506, 508 may form the diamond shaped patterns of the score lines as shown in FIGS. 1C, 2, 3, 6, 8, 9A, and 9C.

The first set of spiral protrusions 512 and the second set of spiral protrusion 514 may be at a 45-degree angle relative to each other, a 60-degree angle relative to each other, or some other angle relative to each other to form diamond shaped patterns 511.

In some embodiments, the first set of spiral protrusions 512 and the second set of spiral protrusions 514 may be at a 45-degree angle relative to a rotation axis of the scoring rollers 506, 508. In some embodiments the first set of spiral protrusion 512 and the second set of spiral protrusions 514 may be at a 60-degree angle relative to the rotation axis of the scoring rollers 506, 508. In some embodiments, the first set of spiral protrusions 512 and the second set of spiral protrusion 514 may be at some other angle relative to the rotation axis of the scoring rollers 506, 508.

In some embodiments of the scoring rollers 506, 508 only one of either the first set of spiral protrusions 512 and the second set of spiral protrusions 514 is present. For example if only the second spiral protrusions 514 are present, the scoring rollers 506, 508 may form the diagonal score lines as shown in FIG. 5A.

FIG. 19 is directed to at least one of the scoring rollers 506, 508, which includes a triangular shaped pattern 516. The scoring rollers 506, 508 include the first set of spiral protrusions 512 that extend in the first direction and the second set of spiral protrusions 514 that extend in the second direction transverse to the first direction. The first set of spiral protrusions 512 and the second set of spiral protrusions 514 overlap and cross over each other. However, unlike the scoring rollers 506, 508 as shown in FIG. 18, the scoring rollers 506, 508 as shown in FIG. 19 include a third set of protrusions 518 that are transverse to the first set of spiral protrusions 512 and the second set of spiral protrusion 514. The third set of protrusions 518 are transverse to the first and second sets of spiral protrusion 512, 514, respectively, and the third set of protrusions 518 are vertically aligned based on the orientation of the scoring roller 506, 508 as shown in FIG. 19. The first, second, and third sets of protrusions 512, 514, 518 form the triangular shaped patterns 516, which are utilized to form the score lines as shown in FIGS. 9B and 9D with the triangular shaped score lines.

In some embodiments, the third set of protrusion 518 may be horizontally aligned instead of vertically aligned based on the orientation of the scoring rollers 506, 508 as shown in FIG. 19.

The flutes of the embodiments of the blanks and the shipping containers as discussed in the present disclosure may be spaced apart from each other by a distance ranging from substantially 0.25-inches to 2-inches. For example, respective adjacent peaks of a set of flutes may be spaced apart by a distance ranging substantially from 0.25-inches to 2-inches. For example, a first peak of one of the flutes is spaced apart from a peak of another of the flutes adjacent to the first peak by a distance ranging from substantially 0.25-inches to 2-inches In some embodiments, the first distance may be identical and equal between the respective adjacent peaks. In some embodiments the distance may vary or be different between the respective adjacent peaks.

The score lines of the embodiments of the blanks and the shipping containers as discussed in the present discourse may be spaced apart from each other by a distance ranging from substantially 0.25-inches to 2-inches. For example, respective adjacent scores lines of a set of score lines may be spaced apart by a distance ranging substantially from 0.25-inches to 2-inches. For example, a first score line of the score lines may be spaced apart from a second score line of the scores lines by a distance ranging from 0.25-inches to 2-inches.

In some embodiments, the distance may be identical and equal between all of the respective adjacent scores lines. In some embodiments, the distance may vary or be different between respective adjacent scores lines.

As discussed earlier, the present disclosure is directed to at least one embodiment of a shipping container that includes at least a corrugated medium having a plurality of flutes adhered to an outer liner. The corrugated medium and outer liner are configured to be selectively bent and folded in directions aligned and not aligned with flutes of the corrugated medium. This bendability or flexibility of the corrugated medium with the flutes enables the corrugated medium and the outer liner to easily and closely conform to a product placed adjacent to the corrugated medium. In other words, the shipping container of the present disclosure readily conforms to the shape of the product.

In some embodiments, to provide the shipping container of the present disclosure with the bendability, foldability, and, ultimately, conformability, such that the shipping container of the present disclosure more readily conforms to a product, the corrugated medium may have a plurality of score lines that extend along, across, and through the plurality of flutes of the corrugated medium. These scoring lines increase the bendability, the flexibility, the foldability, and the conformability of the flutes and the shipping containers of the present disclosure as a whole.

This greater bendability, foldability, and conformability allows the shipping containers of the present disclosure to readily conform to a product positioned within the shipping containers of the present disclosure. This ability of the shipping containers of the present disclosure to conform to the shape of the products placed in the shipping containers reduces the shipping costs of the product. For example, a first total volume of the product and one of the shipping containers of the present disclosure in which the product is present is less than a second total volume of the same product in shipping containers that does not implement embodiments of the present disclosure. Therefore, shipping the product in one of the shipping containers of the present disclosure costs less than shipping the same product in shipping containers that does not implement embodiments of the present disclosure.

In some embodiments, the shipping containers of the present disclosure include a first panel and a second panel opposite to the first panel. The first panel includes a first corrugated medium coupled to an outer liner. The second panel includes a second corrugated medium coupled to the outer liner. The first corrugated medium and the second corrugate medium are spaced apart from each other. Folding the outer liner onto itself forms embodiments of ones of the shipping containers of the present disclosure.

In some embodiments, when the outer liner is folded onto itself, first flutes of the first corrugated medium are offset relative to second flutes of the second corrugated medium such that the first flutes nest within the second flutes and vice versa. For example, the first flutes include first peaks and first valleys, and the second flutes include second peaks and second valleys. The first peaks of the first flutes are received by ones of the second valleys of the second flutes, and the second peaks of the second flutes are received by ones of the first valleys of the first flutes due to this offset of the first flutes relative to the second flutes. This offset configuration of the first and second flutes of the first and second corrugated mediums, respectively, reduces the overall thickness of the shipping containers of the present disclosure when compressed flat relative to shipping containers where the flutes do not nest within each other when the shipping containers are compressed flat. This offset configuration of the first and second flutes results in shipping containers that can be shipped to a retailer in fewer boxes or containers, thereby reducing the overall shipping costs to ship the shipping containers to the retailer.

In some embodiments, the shipping containers of the present disclosure are made entirely of a paper material. In some embodiments, the shipping containers of the present disclosure are made entirely of a plastic material.

Unlike the conventional shipping containers that are generally made of multiple materials (e.g., plastic and paper such as the conventional bubble mailers) that have to be broken apart to recycle the conventional shipping containers, some embodiments of the shipping containers of the present disclosure may be entirely composed of paper materials such that these embodiments of the shipping containers of the present disclosure do not have to be broken down into various materials to be recycled. In other words, the consumer, customer, or buyer may readily recycle these embodiments of the shipping containers of the present disclosure by simply placing these embodiments of the shipping containers of the present disclosure into a recycling bin without any processing beforehand.

The shipping containers of the present disclosure with flutes that line an interior pocket of the shipping containers of the present disclosure may be formed by corrugating rollers of the present disclosure.

In at least one embodiment of a corrugating roller of the present disclosure, the corrugating roller includes a first end and a second end opposite to the first end. The corrugating roller includes first regions and second regions along an outer surface of the corrugating roller. The first regions may be flat regions and the second regions may be a plurality of "B" sized flute regions at which a plurality of "B" sized flutes are located. The first regions (e.g., flat regions, flat surfaces, etc.) extend from the first end to the second end. The second regions (e.g., flute regions, flute surfaces) extend from the first end to the second end. The flutes at the second regions are horizontally aligned based on the orientation of the corrugating roller. The flutes at the second regions extend from the first end to the second end.

In at least one embodiment of a corrugating roller of the present disclosure, the corrugating roller includes first regions, second regions, third regions, and fourth regions along an outer surface of the corrugating roller. The first regions are flat (e.g., flat surface, flat region, etc.), and the second, third, and fourth regions have flutes and may be referred to as fluted regions (e.g., regions with groups of flutes). The flutes at the second regions are offset with respect to the flutes at the third regions, and the flutes at the fourth regions separate the flutes at the second regions from the flutes at the third regions. The flutes at the fourth region are transverse to the flutes at the second region and the third regions. The offset of the flutes at the second regions and the third regions form the offset flutes of embodiments of the shipping container as discussed earlier forming shipping containers that more readily flex, bend, and conform to a shape and size of a product that is positioned within the shipping container with the offset flutes.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A recyclable shipping container, comprising:

a single face corrugated material that includes an outer liner layer and an inner corrugated layer, the inner corrugated layer including a plurality of flutes;

wherein the flutes extend across a first portion of the inner corrugated layer, such that the first portion of the inner corrugated layer is fluted, and do not extend across a second portion of the inner corrugated layer, such that the second portion of the inner corrugated layer is flat;

wherein the single face corrugated material is folded along a fold line that divides the corrugated material between a first panel and a second panel opposite to the first panel across the fold line.

2. The recyclable shipping container of claim 1, wherein the second portion of the inner corrugated layer extends along locations at which the corrugated material is configured to be cut to form individual portions of the corrugated material.

3. The recyclable shipping container of claim 1, wherein:

the first panel includes a first side edge portion that extends parallel to the flutes and a second side edge portion that extends parallel to the flutes;

the second panel includes a first side edge portion that extends parallel to the flutes and a second side edge portion that extends parallel to the flutes; and the second portion of the inner corrugated layer extends along the first side edge portion of the second panel and along the first side edge portion of the second panel, such that the flutes are not present along the first side edge portion of the first panel and not present along the first side edge portion of the second panel.

4. The recyclable shipping container of claim 3, wherein:

the flutes do not extend across a third portion of the inner corrugated layer, such that the third portion of the inner corrugated layer is flat; and the third portion of the inner corrugated layer extends along the second side edge portion of the first panel and extends along the second side edge portion of the second panel, such that the flutes are not present along the second side edge portion of the first panel and not present along the second side edge portion of the second panel.

5. The recyclable shipping container of claim 1, wherein the second portion of the inner corrugated layer extends parallel to the flutes.

6. The recyclable shipping container of claim 1, wherein the second portion of the inner corrugated layer extends along the fold line.

7. The recyclable shipping container of claim 1, wherein the second portion of the inner corrugated layer extends perpendicular to the flutes.

8. A recyclable shipping container, comprising:

a single face corrugated material that includes an outer liner layer and an inner corrugated layer, the inner corrugated layer including a plurality of flutes;

wherein the flutes extend across a first portion of the inner corrugated layer, such that the first portion of the inner corrugated layer is fluted, and do not extend across a second portion of the inner corrugated layer, such that the second portion of the inner corrugated layer is flat; and one or more score lines extend across the first portion of the inner corrugated layer, and the one or more score lines are configured to, in operation, provide conformability to the first portion of the inner corrugated layer;

wherein the single face corrugated material is folded along a fold line that divides the corrugated material between a first panel and a second panel opposite to the first panel across the fold line.

9. The recyclable shipping container of claim 8, wherein the second portion of the inner corrugated layer extends along locations at which the corrugated material is configured to be cut to form individual portions of the corrugated material.

10. The recyclable shipping container of claim 8, wherein:

the first panel includes a first edge portion that extends parallel to the flutes and a second side edge portion that extends parallel to the flutes;

the second panel includes a first side edge portion that extends parallel to the flutes and a second side edge portion that extends parallel to the flutes; and the second portion of the inner corrugated layer extends along the first side edge portion of the second panel and along the second side edge portion of the second panel.

11. The recycle shipping container of claim 8, wherein the flutes do not extend across a third portion of the inner corrugated layer, such that the third portion of the inner corrugated layer is flat; and the third portion of the inner corrugated layer extends along the second side edge portion of the first panel and along the second side edge portion of the second panel.

12. The recyclable shipping container of claim 8, wherein the second portion of the inner corrugated layer extends parallel to the flutes.

13. The recyclable shipping container of claim 8, wherein the second portion of the inner corrugated layer extends along the fold line.

14. The recyclable shipping container of claim 8, wherein the second portion of the inner corrugated layer extends perpendicular to the flutes.

15. The recyclable shipping container of claim 8, wherein the one or more score lines includes at least one first score line that is transverse to the flutes and extends across the flutes.

16. The recyclable shipping container of claim 15, wherein the one or more score lines includes at least one second score line that is transverse to the flutes, is transverse to the at least one first score line, and extends across the flutes.

17. A recyclable shipping container, comprising:

a single face corrugated material that includes an outer liner layer and an inner corrugated layer, the single face corrugated material includes a first side edge and a second side edge opposite to the first side edge, and the inner corrugated layer includes a plurality of flutes;

wherein the flutes extend across a first portion of the inner corrugated layer between the first side edge and the second side edge, such that the first portion of the inner corrugated layer is fluted, and do not extend across a second portion of the inner corrugated layer at the first side edge and do not extend across a third portion of the inner corrugated layer at the second side edge, such that the second portion and the third portion of the inner corrugated layer are flat;

wherein the single face corrugated material is folded along a fold line at a fourth portion of the inner corrugated layer, the fold line and the fourth portion divides the corrugated material between a first panel and a second panel opposite to the first panel across the fold line and the fourth portion, and the fourth portion is flat.

18. The recyclable shipping container of claim 17, wherein the second portion is part of a first side wrap portion.

19. The recyclable shipping container of claim 17, wherein the third portion is part of a second side wrap portion.

20. The recyclable shipping container of claim 17, further comprising an adhesive on the second portion and the third portion.

* * * * *